(12) United States Patent
Bai et al.

(10) Patent No.: US 11,617,170 B2
(45) Date of Patent: Mar. 28, 2023

(54) UPLINK BEAM FAILURE REPORT AND BEAM RESET FOR MULTIPLE COMPONENT CARRIERS

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/110,926

(22) Filed: Dec. 3, 2020

(65) Prior Publication Data
US 2021/0243743 A1 Aug. 5, 2021

Related U.S. Application Data

(60) Provisional application No. 62/968,912, filed on Jan. 31, 2020.

(51) Int. Cl.
*H04W 72/04* (2009.01)
*H04W 72/044* (2023.01)
*H04W 72/08* (2009.01)

(52) U.S. Cl.
CPC ....... *H04W 72/044* (2013.01); *H04W 72/048* (2013.01); *H04W 72/0413* (2013.01); *H04W 72/085* (2013.01)

(58) Field of Classification Search
CPC ........... H04W 72/044; H04W 72/0413; H04W 72/048; H04W 72/085; H04B 7/0695; H04B 7/068; H04B 7/0639; H04L 5/001; H04L 5/0091; H04L 27/261
See application file for complete search history.

(56) References Cited

U.S. PATENT DOCUMENTS

| 2019/0109687 | A1* | 4/2019 | Takeda | H04B 7/0639 |
| 2019/0230545 | A1 | 7/2019 | Liou et al. | |
| 2021/0315041 | A1* | 10/2021 | Matsumura | H04W 72/0413 |
| 2022/0140882 | A1* | 5/2022 | Matsumura | H04L 27/261 370/329 |

OTHER PUBLICATIONS

Apple: "R17 MIMO Enhancements", 3GPP Draft, 3GPP TSG RAN Meeting #85, RP-192174 R17 NR MIMO Enhancements, 3rd Generation Partnership Project (3GPP), Mobile Competence Centre, 650, Route Des Lucioles, F-06921 Sophia-Antipolis Cedex, France, vol. TSG RAN, No. Newport Beach, USA, Sep. 16, 2019-Sep. 20, 2019 Sep. 9, 2019 (Sep. 9, 2019), XP051782724, pp. 1-6, Retrieved from the Internet: URL:http//www.3gpp.org/flp/tsg_ran/TSG_RAN/TSGR_85/Docs/RP-192174.zip, [retrieved on Sep. 9, 2019] section 2, p. 2-p. 3.

(Continued)

*Primary Examiner* — Vinncelas Louis
(74) *Attorney, Agent, or Firm* — Patterson & Sheridan, LLP

(57) ABSTRACT

Certain aspects of the present disclosure relate to methods and apparatus for updating beam information across a plurality of component carriers (CCs) via downlink control information (DCI).

30 Claims, 18 Drawing Sheets

(56) References Cited

OTHER PUBLICATIONS

Intel Corporation: "Solution Enhancements to Mitigate Link Failures in FR2", 3GPP Draft, 3GPP RAN4 WG Meeting #92Bis, R4-1912287—Solution Enhancements to Mitigate Link Failures in FR2, 3rd Generation Partnership Project (3GPP), Mobile Competence Centre, 650, Route Des Lucioles, F-06921 Sophia-Antipoli vol. RAN WG4, No. Chongqing, China, Oct. 14, 2019-Oct. 18, 2019 Oct. 4, 2019 (Oct. 4, 2019), XP051807017, pp. 1-3, section 2.2.2, p. 2.
International Search Report and Written Opinion—PCT/US2020/063422—ISA/EPO—dated Mar. 2, 2021.

\* cited by examiner

```
TCI-State ::=
   tci-stateid
   qcl-type1
   qcl-type2
       } qcl-Info ::=
   cell
   bwp-Id
   Comp Csi-RS-Indication
   references-signal
   csi-rs
   ssb
   csi-rs-for-tracking
   ...
   qcl-Type
}
```

```
sequence {
   tci-stateid,
   qcl-info,
   qcl-info
   enumerated (n1, n2)

sequence {
   servcellindex choice {
   nzp-csi-rs-Resourceid,
   ssb-index,
   nzp-csi-rs-Resourcesset-id enumerated (typeA, typeB, typeC, typeD)
```

FIG. 7

UPLINK BEAM FAILURE REPORT AND BEAM RESET FOR MULTIPLE COMPONENT CARRIERS

CROSS-REFERENCE TO RELATED APPLICATION

This application claims benefit of and priority to U.S. Provisional Patent Application No. 62/968,912, filed Jan. 31, 2020, which is hereby incorporated by reference in its entirety.

FIELD OF THE DISCLOSURE

The present disclosure relates generally to wireless communication systems, and more particularly, to methods and apparatus for reporting an uplink beam failure for multiple component carriers (CCs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include long term evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipments (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on a downlink and on an uplink as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes receiving, from a network entity, signaling configuring the UE with a group of component carriers (CCs), detecting a failed uplink beam on one of the CCs in the group, reporting the failed uplink beam to the network entity, and taking one or more actions to apply one or more new uplink beams on the CCs in the group.

Certain aspects provide a method for wireless communications by a network entity. The method generally includes configuring a UE with a group of CCs, receiving, from the UE, a report of a failed uplink beam on one of the CCs in the group, determining the same uplink beam has failed across other CCs in the group, and taking one or more actions to apply one or more new uplink beams on the CCs in the group.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example of transmission configuration indicator (TCI) state information used to signal quasi-colocation (QCL) information, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
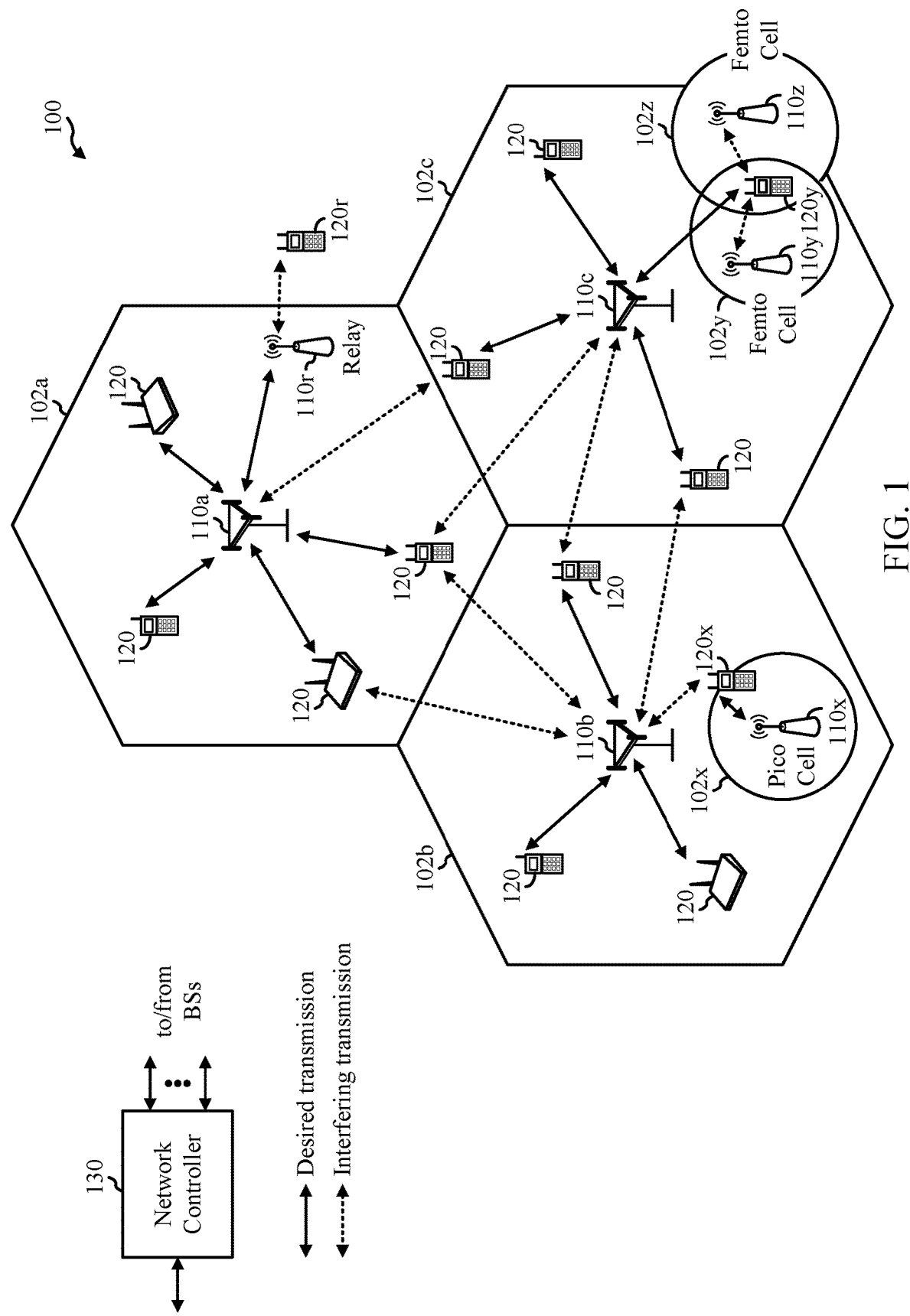
FIG. 1 is a block diagram conceptually illustrating an example telecommunications system, in accordance with certain aspects of the present disclosure.

Aspects of the present disclosure provide mechanisms for reporting an uplink beam failure, and resetting an uplink beam, across multiple component carriers (CCs). The mechanisms may be applied for a new radio (NR) access technology or a $5^{th}$ generation (5G) technology.

The NR may support various wireless communication services, such as enhanced mobile broadband (eMBB) targeting wide bandwidth (e.g. 80 MHz beyond), millimeter wave (mmW) targeting high carrier frequency (e.g. 60 GHz), massive machine type communications (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in a same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as long term evolution (LTE), code division multiple access (CDMA), time division multiple access (TDMA), frequency division multiple access (FDMA), orthogonal frequency division multiple access (OFDMA), single-carrier frequency division multiple access (SC-FDMA) and other networks. The terms "network" and "system" are often used interchangeably. A CDMA network may implement a radio technology such as universal terrestrial radio access (UTRA), cdma2000, etc. UTRA includes wideband CDMA (WCDMA) and other variants of CDMA. cdma2000 covers IS-2000, IS-95 and IS-856 standards. A TDMA network may implement a radio technology such as global system for mobile communications (GSM). An OFDMA network may implement a radio technology such as NR (e.g. 5G RA), Evolved UTRA (E-UTRA), ultra-mobile broadband (UMB), IEEE 802.11 (Wi-Fi), IEEE 802.16 (WiMAX), IEEE 802.20, Flash-OFDMA, etc. UTRA and E-UTRA are part of universal mobile telecommunication system (UMTS). The NR is an emerging wireless communications technology under development in conjunction with the 5G Technology Forum (5GTF). 3GPP LTE and LTE-Advanced (LTE-A) are releases of the UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, the wireless network 100 may include one or more user equipments (UEs) 120 configured to perform operations 1500 of FIG. 15. Similarly, the network 100 may include one or more base stations (BSs) 110 configured to perform operations 1400 of FIG. 14.

As illustrated in FIG. 1, the wireless network 100 may include a number of BSs 110 and other network entities. A BS 110 may be a station that communicates with UEs 120. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the BSs 110 may be interconnected to one another and/or to one or more other BSs 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cell. A macro cell may cover a relatively large geographic area (e.g., several kilometers in radius) and may allow unrestricted access by the UEs 120 with service subscription. A pico cell may cover a relatively small geographic area and may allow unrestricted access by UEs with service subscription. A femto cell may cover a relatively small geographic area (e.g., a home) and may allow restricted access by the UEs 120 having association with the femto cell (e.g., UEs 120 in a closed subscriber group (CSG), UEs 120 for users in the home, etc.). A BS 110 for a macro cell may be referred to as a macro BS. A BS 110 for a pico cell may be referred to as a pico BS. ABS 110 for a femto cell may be referred to as a femto BS or a home BS. In the example shown in FIG. 1, the BSs 110a, 110b and 110c may be macro BSs for the macro cells 102a, 102b and 102c, respectively.

The BS 110x may be a pico BS for a pico cell 102x. The BSs 110y and 110z may be femto BS for the femto cells 102y and 102z, respectively. ABS 110 may support one or multiple (e.g., three) cells.

The wireless network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs 120. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs 110 of different types, e.g., macro BS, pico BS, femto BS, relays, etc. These different types of BSs 110 may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs 110 may have similar frame timing, and transmissions from different BSs 110 may be approximately aligned in time. For asynchronous operation, the BSs 110 may have different frame timing, and transmissions from different BSs 110 may not be aligned in time. The techniques described herein may be used for both synchronous and asynchronous operation.

A network controller 130 may be coupled to a set of BSs 110 and provide coordination and control for these BSs 110. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE 120 may be stationary or mobile. A UE 120 may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs 120 may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include devices that are capable of MTC communications with MTC servers and/or other MTC devices through public land mobile networks (PLMN), for example. MTC and eMTC UEs include, for example, robots, drones, remote devices, sensors, meters, monitors, cameras, location tags, etc., that may communicate with a BS 110, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE 120 and a serving BS 110, which is a BS 110 designated to serve the UE 120 on a downlink and/or an uplink. A dashed line with double arrows indicates interfering transmissions between a UE 120 and a BS 110.

Certain wireless networks (e.g., long-term evolution (LTE)) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and the downlink, and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length (period) of 10 ms. Consequently, each subframe may have a length of 0.2 ms. In some cases, subframes may have a length (duration) of 1 ms and each subframe may be further divided into two slots of 0.5 ms each (e.g., with each slot containing 6 or 7 OFDM symbols depending on cyclic prefix (CP) length. A slot may be further divided into mini-slots, each mini-slot having a smaller duration (e.g., containing fewer symbols than a full slot). Each subframe may indicate a link direction (e.g., the downlink or the uplink) for data transmission and the link direction for each subframe may be dynamically switched. Each subframe may include downlink/uplink data as well as downlink/uplink control data. Beamforming may be supported and beam direction may be dynamically configured. Multiple-input multiple-output (MIMO) transmissions with precoding may also be supported. MIMO configurations in the downlink may support up to 8 transmit antennas with multi-layer downlink transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS 110) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE 120 may function as a scheduling entity, scheduling resources for one or more subordinate entities (e.g., one or more other UEs 120). In this example, the UE 120 is functioning as a scheduling entity, and other UEs 120 utilize resources scheduled by the UE 120 for wireless communication. A UE 120 may function as a scheduling entity in a peer-to-peer (P2P) network, and/or in a mesh network. In a mesh network example, UEs 120 may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs 110. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs 110 may transmit downlink signals to UEs 120 indicating the cell type. Based on the cell type indication, the UE 120 may communicate with the NR BS 110. For example, the UE 120 may determine NR BSs 110 to consider for cell selection, access, handover, and/or measurement based on the indicated cell type.

Figure 2:
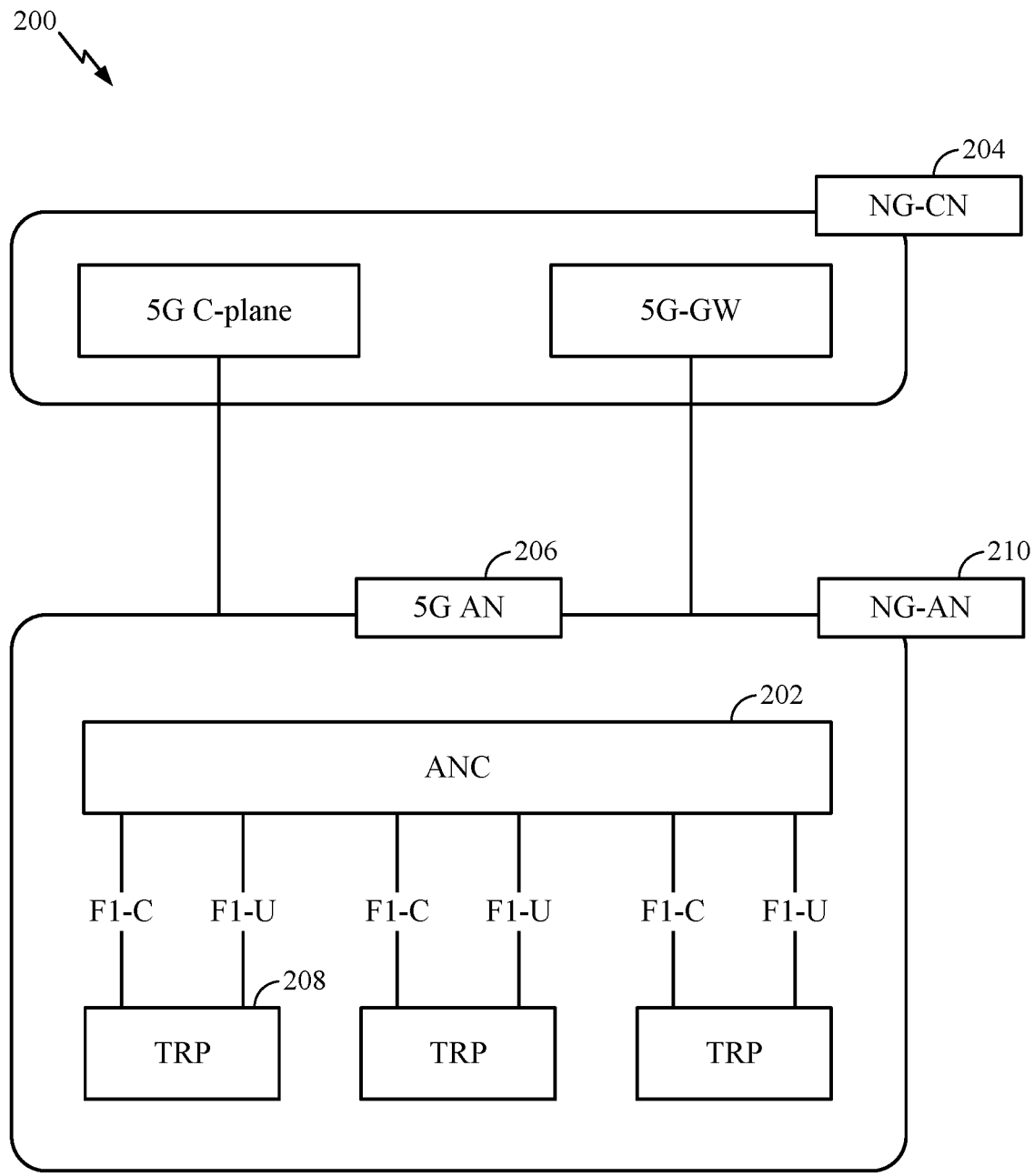
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a distributed unit (DU). The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The architecture may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture. As will be described in more detail with reference to FIG. 5, radio resource control (RRC) layer, packet data convergence protocol (PDCP) layer, radio link control (RLC) layer, medium access control (MAC) layer, and physical (PHY) layer may be adaptably placed at the DU or CU (e.g., TRP or ANC, respectively). According to certain aspects, a BS may include a CU (e.g., ANC 202) and/or one or more DUs (e.g., one or more TRPs 208).

Figure 3:
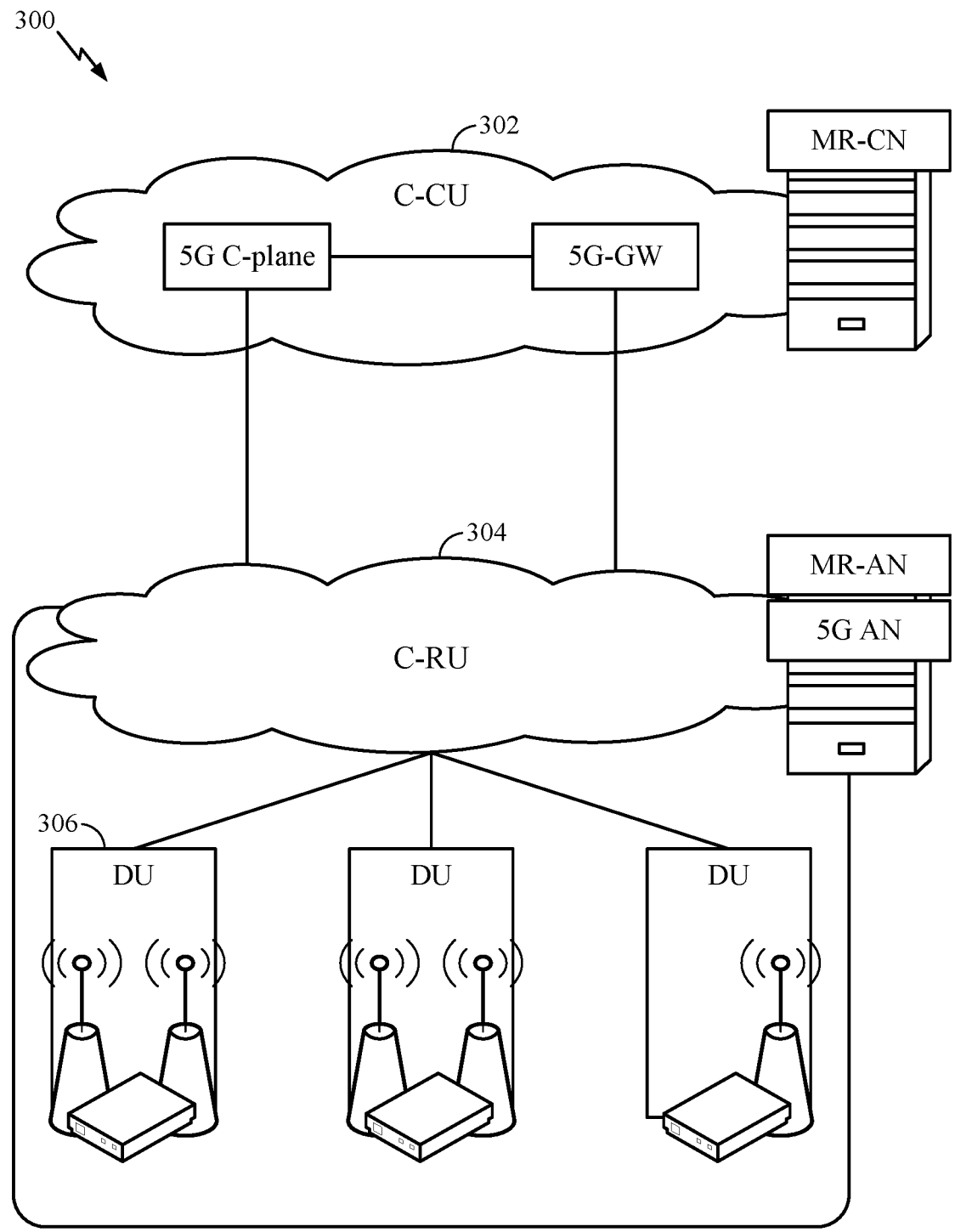
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. The C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be closer to the network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
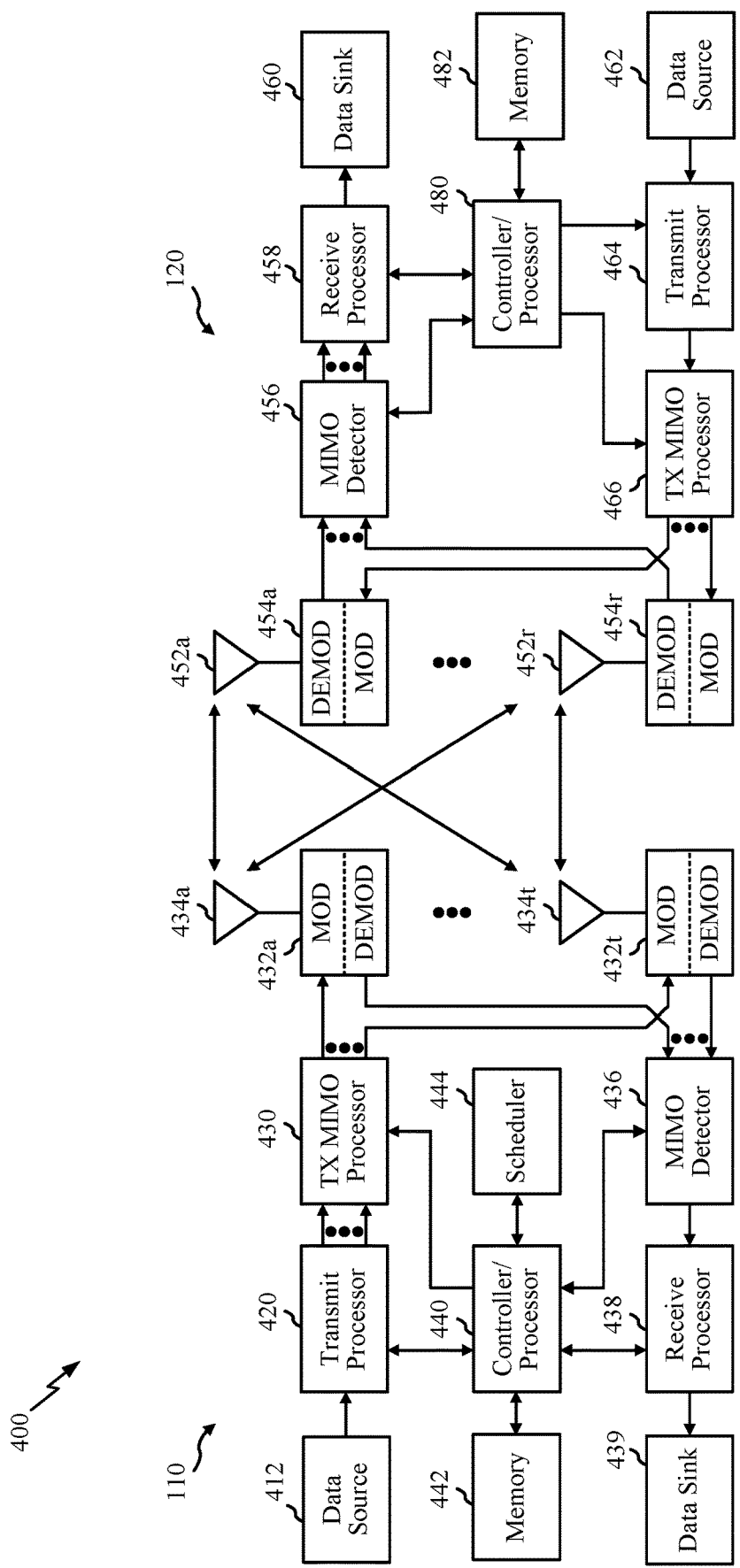
FIG. 4 is a block diagram conceptually illustrating a design of an example base station (BS) and a user equipment (UE), in accordance with certain aspects of the present disclosure.

FIG. 4 illustrates example components of a BS 110 and a UE 120 illustrated in FIG. 1, which may be used to implement aspects of the present disclosure. As described above, the BS 110 may include a TRP. One or more components of the BS 110 and the UE 120 may be used to practice aspects of the present disclosure. For example, antennas 452, processors 466, 458, 464, and/or controller/processor 480 (used to implement transceiver or separate receiver and transmitter chain functions) of the UE 120 may be used to perform operations 1500 of FIG. 15. Similarly, antennas 434, processors 430, 420, 438, and/or controller/processor 440 of the BS 110 may be used to perform operations 1400 of FIG. 14.

For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for physical broadcast channel (PBCH), physical control format indicator channel (PCFICH), physical hybridARQ indicator channel (PHICH), physical downlink control channel (PDCCH), etc. The data may be for physical downlink shared channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (Tx) MIMO processor 430 may perform spatial processing (e.g., precoding) on the data symbols, the control symbols, and/or the reference symbols, if applicable, and may provide output symbol streams to modulators (MODs) 432a through 432t in transceivers. For example, the TX MIMO processor 430 may perform certain aspects described herein for RS multiplexing. Each MOD 432 may process a respective output symbol stream (e.g., for OFDM, etc.) to obtain an output sample stream. Each MOD 432 may further process (e.g., convert to analog, amplify, filter, and upconvert) the output sample stream to obtain a downlink signal. The downlink signals from MODs 432a through 432t may be transmitted via the antennas 434a through 434t, respectively.

At the UE 120, the antennas 452a through 452r may receive the downlink signals from the BS 110 and may provide received signals to demodulators (DEMODs) 454a through 454r in transceivers, respectively. Each DEMOD 454 may condition (e.g., filter, amplify, downconvert, and digitize) a respective received signal to obtain input samples. Each DEMOD 454 may further process the input samples (e.g., for OFDM, etc.) to obtain received symbols. A MIMO detector 456 may obtain received symbols from all the DEMODs 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/receive (Rx) functionalities, such that they reside in DUs. For example, some Tx/Rx processings can be done in the CU, while other processing can be done at the DUs. For example, in accordance with one or more aspects as shown in the diagram, the BS MOD/DEMOD 432 may be in the DUs.

On the uplink, at the UE 120, a transmit processor 464 may receive and process data (e.g., for physical uplink shared channel (PUSCH)) from a data source 462 and control information (e.g., for physical uplink control channel (PUCCH) from the controller/processor 480. The transmit processor 464 may also generate reference symbols for a reference signal. The symbols from the transmit processor 464 may be precoded by a TX MIMO processor 466 if applicable, further processed by the DEMODs 454a through 454r (e.g., for SC-FDM, etc.), and transmitted to the BS 110. At the BS 110, the uplink signals from the UE 120 may be received by the antennas 434, processed by the MODs 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. As noted above, the processor 440 and/or other processors and modules at the BS 110 may perform or direct the processes for the techniques described herein with reference to FIG. 14. The processor 480 and/or other processors and modules at the UE 120 may also perform or direct processes for the techniques described herein with reference to FIG. 15. The memories 442 and 482 may store data and program codes for the BS 110 and the UE 120, respectively. A scheduler 444 may schedule UEs 120 for data transmission on a downlink and/or an uplink.

Figure 5:
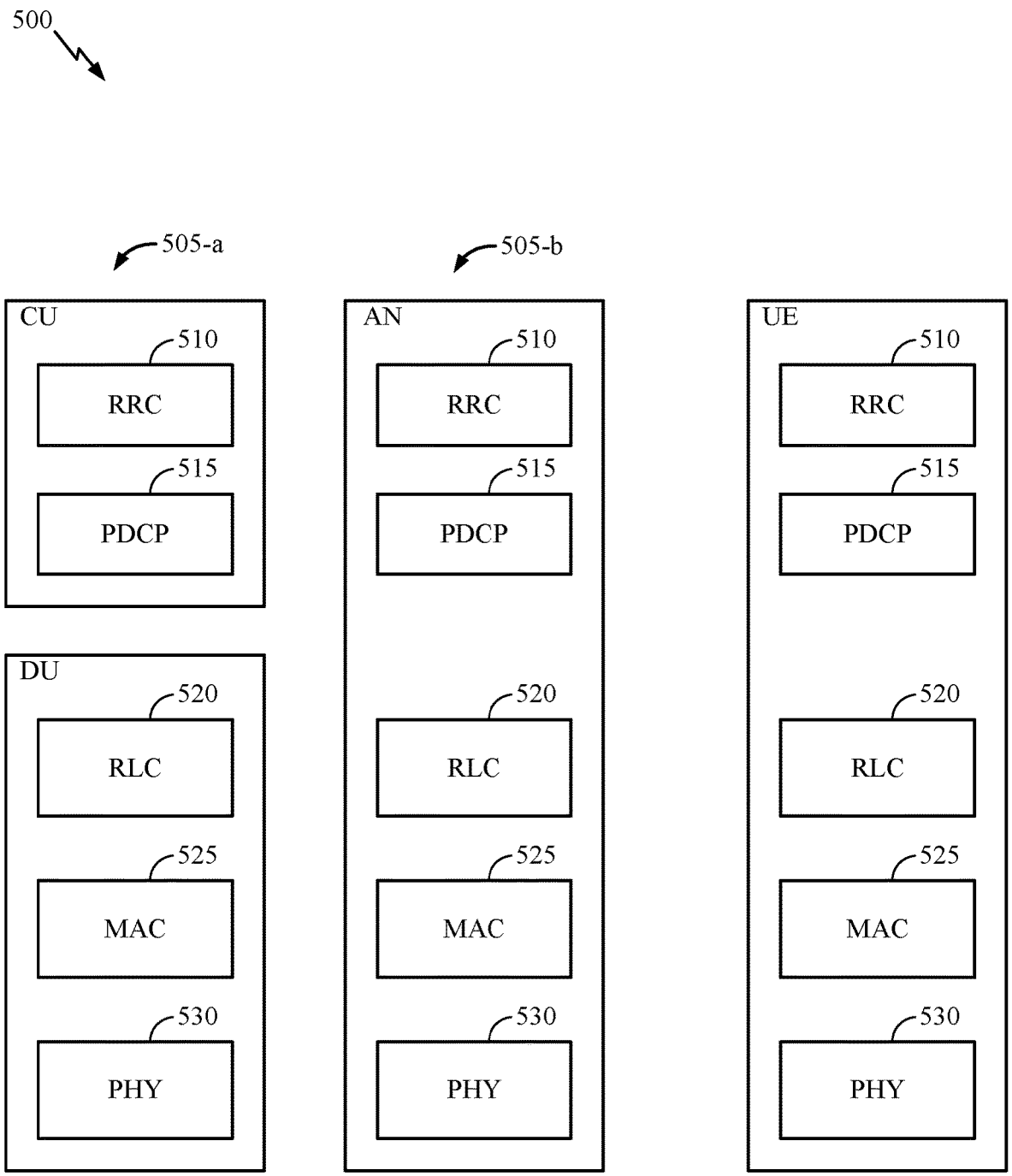
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system (e.g., a system that supports uplink-based mobility). The diagram 500 illustrates a communications protocol stack including a RRC layer 510, a PDCP layer 515, a RLC layer 520, a MAC layer 525, and a PHY layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, a RRC layer 510 and a PDCP layer 515 may be implemented by the CU, and a RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), a new radio base station (NR BS), a new radio Node-B (NR NB), a network node (NN), or the like.). In the second option 505-b, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
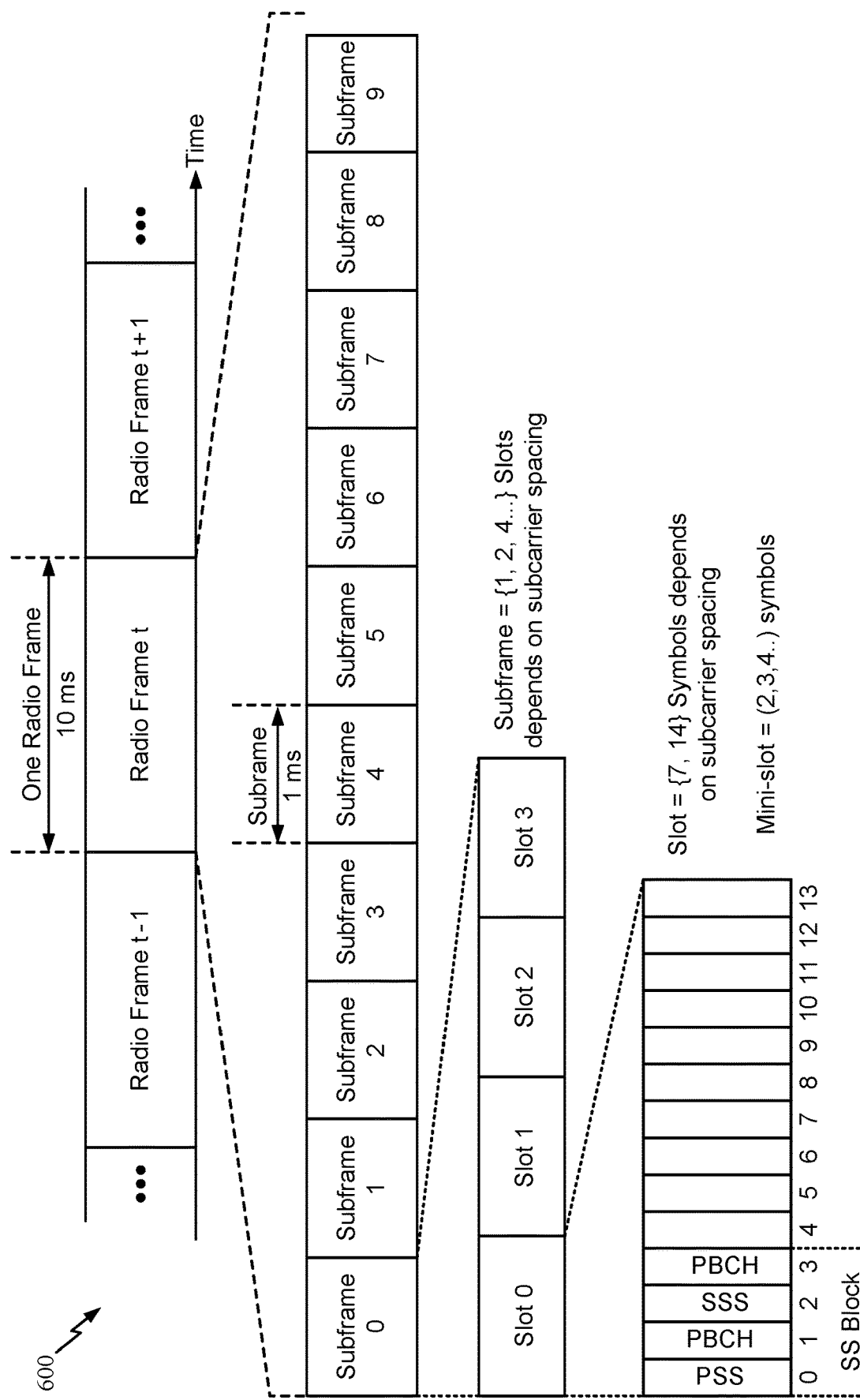
FIG. 6 illustrates an example of a frame format for a new radio (NR) system, in accordance with certain aspects of the present disclosure.

FIG. 6 is a diagram showing an example of a frame format 600 for NR. The transmission timeline for each of downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., downlink, uplink, or flexible) for data transmission and the link direction for each subframe may be dynamically switched. The link directions may be based on the slot format. Each slot may include downlink/uplink data as well as downlink/uplink control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes.

A UE may operate in various radio resource configurations, including a configuration associated with transmitting pilots using a dedicated set of resources (e.g., a RRC dedicated state, etc.) or a configuration associated with transmitting pilots using a common set of resources (e.g., a RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example QCL Signaling

In many cases, it is important for a user equipment (UE) to know which assumptions it can make on a channel corresponding to different transmissions. For example, the UE may need to know which reference signals it can use to estimate the channel in order to decode a transmitted signal (e.g., a physical downlink control channel (PDCCH) or a physical downlink shared channel (PDSCH)). It may also be important for the UE to report relevant channel state information (CSI) to a base station (BS) (e.g., gNB) for scheduling, link adaptation, and/or beam management purposes. In a new radio (NR), the concept of quasi co-location (QCL) and transmission configuration indicator (TCI) states is used to convey information about these assumptions.

QCL assumptions are defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL' d") if a receiver (e.g., a UE) can apply channel properties determined by detecting a first reference signal to help detect a second reference signal. TCI states generally include configurations such as QCL-relationships, for example, between downlink reference signals (RSs) in one channel state information RS (CSI-RS) set and the PDSCH demodulation RS (DMRS) ports.

In some cases, a UE may be configured with up to M TCI-States. Configuration of the M TCI-States can come about via higher layer signaling, while the UE may be signalled to decode the PDSCH according to a detected PDCCH with downlink control information (DCI) indicating one of the TCI states. For example, a particular TCI state may be indicated by an N bit DCI field for a PDSCH. Each configured TCI state may include one RS set TCI-RS-SetConfig that indicates different QCL assumptions between certain source and target signals.

In certain deployments, techniques are used to provide QCL signaling for RS and channels across scenarios involving multiple cells, such as coordinated multipoint (CoMP) scenarios in which multiple transmit receive points (TRPs) or integrated access and backhaul (IAB) nodes each have their own cell ID.

FIG. 7 illustrates an example of how RSs associated with TCI states may be configured via radio resource control (RRC) signaling. QCL information and/or types may in some scenarios depend on or be a function of other information. For example, the QCL types indicated to a UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help the UE to select an analog receive (Rx) beam (e.g., during beam management procedures). For example, a synchronization signal (SS) block resource indicator may indicate a same beam for a previous reference signal should be used for a subsequent transmission.

As illustrated in FIG. 7, the TCI states may indicate which RS are QCL'd and the QCL type. The TCI state may also indicate a ServCellIndex that is a short identity, used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

Figure 8:
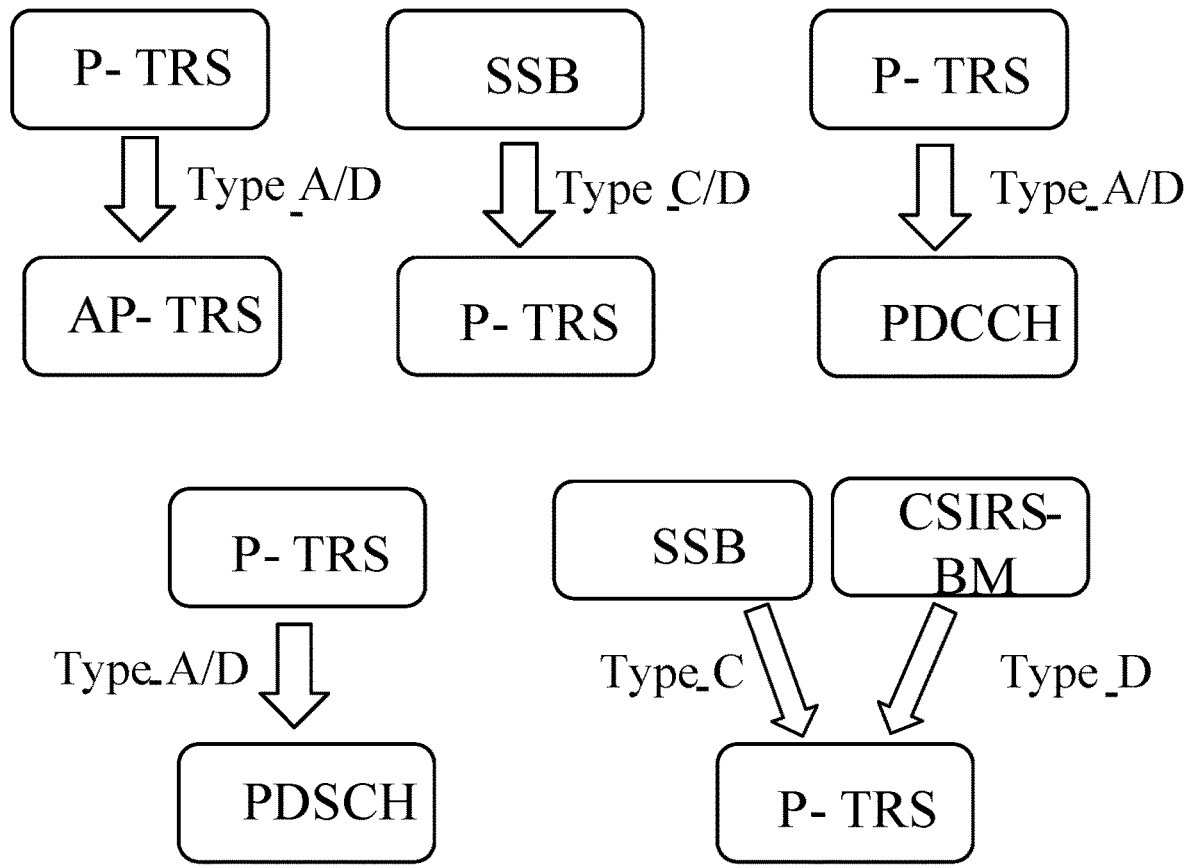
FIG. 8 graphically illustrates example QCL relationships between source and target reference signals, in accordance with certain aspects of the present disclosure.

FIG. 8 illustrate examples of association of downlink RSs with corresponding QCL types that may be indicated by a TCI-RS-SetConfig.

In the examples of FIG. 8, a source RS is indicated in a top block and is associated with a target signal indicated in a bottom block. In this context, a target signal refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: a physical uplink shared channel (PUSCH) DMRS, a CSI-RS, a tracking RS (TRS), and a sounding RS (SRS).

As illustrated, each TCI-RS-SetConfig contains parameters. These parameters can, for example, configure QCL relationship(s) between RSs in the RS set and the DM-RS port group of the PDSCH. The RS set contains a reference to either one or two downlink RSs and an associated QCL-Type for each one configured by the higher layer parameter QCL-Type.

As illustrated in FIG. 8, for the case of two downlink RSs, the QCL types can take on a variety of arrangements. For example, the QCL types may not be the same, regardless of whether the references are to the same downlink RS or different downlink RSs. In the illustrated example, the SSB is associated with Type C QCL for P-TRS, while the CSI-RS for beam management (CSIRS-BM) is associated with Type D QCL.

Figure 9:
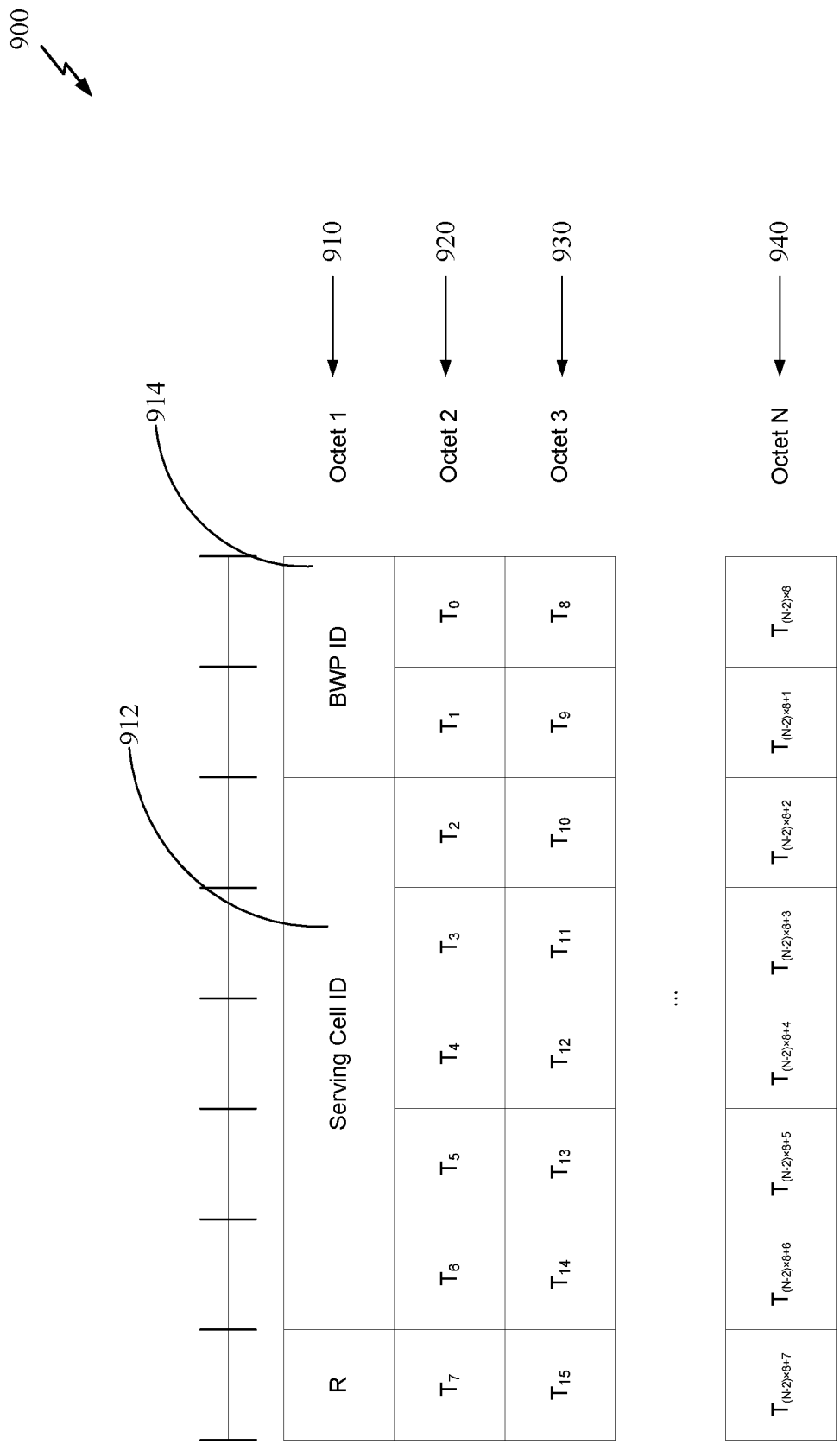
FIG. 9 illustrates an exemplary medium access control (MAC) control element (CE) for activating or deactivating TCI-states for a UE-specific physical channel, in accordance with certain aspects of the present disclosure.

FIG. 9 illustrates an exemplary medium access control (MAC) control element (CE) 900 for activating or deactivating TCI-states for a UE-specific PDSCH, according to previously known techniques (e.g., Rel-15). The MAC CE 900 includes a plurality of octets 910, 920, 930, 940, etc. The first octet 910 includes a serving cell ID field 912, which is five bits long and indicates an identity of a serving cell for which the MAC CE 900 applies. The first octet 910 also includes a bandwidth part (BWP) ID field 914 that is two bits long and indicates a downlink BWP for which the MAC CE 900 applies as a code point of downlink control information (DCI) bandwidth part indicator field as specified in TS 38.212 (available from the 3GPP website and other sources). The second octet 920 and later octets include bits indicating TCI states for the serving cell ID 912 and BWP ID 914. For each $T_i$, if there is a TCI state with TCI-StateId i as specified in TS 38.331 (also available from 3GPP), then the corresponding $T_i$ field indicates the activation or deactivation status of the TCI state with TCI-StateId i, otherwise (i.e., there is not a TCI state with TCI-StateID i) the MAC entity ignores the $T_i$ field. The $T_i$ field is set to 1 to indicate that the TCI state with TCI-StateId i is activated and mapped to the code point of the DCI Transmission Configuration Indication field, as specified in TS 38.214 (available from 3GPP). The $T_i$ field is set to 0 to indicate that the TCI state with TCI-StateId i is deactivated and is not mapped to the code point of the DCI Transmission Configuration Indication field. The code point to which the TCI State is mapped is determined by its ordinal position among all the TCI States with $T_i$ field set to 1, i.e. the first TCI State with $T_i$ field set to 1 shall be mapped to the code point value 0, second TCI State with $T_i$ field set to 1 shall be mapped to the code point value 1, and so on. The maximum number of activated TCI states may be 8.

Figure 10:
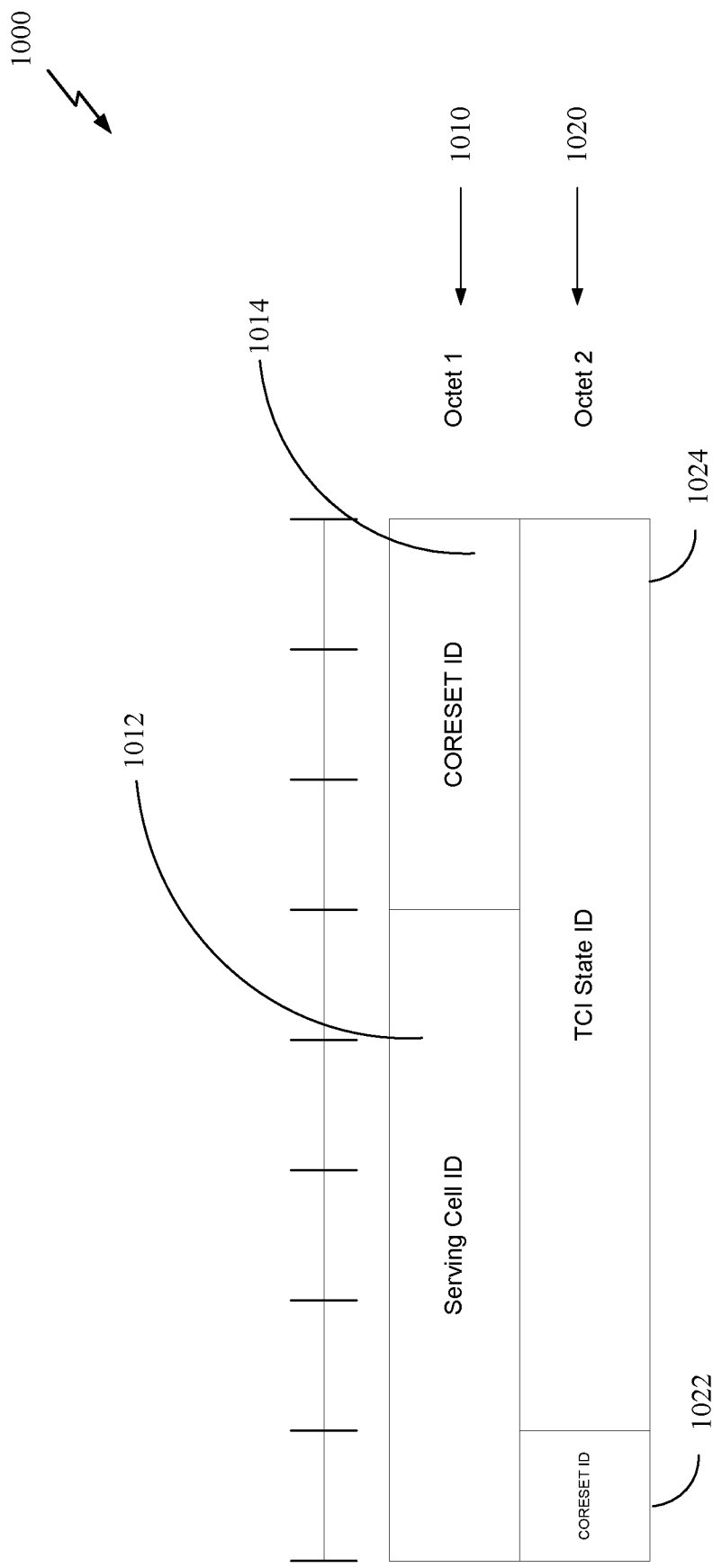
FIG. 10 illustrates an exemplary MAC CE for activating or deactivating a TCI-state for a physical downlink control channel (PDCCH), in accordance with certain aspects of the present disclosure.

FIG. 10 illustrates an exemplary MAC CE 1000 for activating or deactivating a TCI-state for a PDCCH, according to previously known techniques (e.g., Rel-15). A first octet 1010 includes a serving cell ID field 1012 that is five bits long and indicates an identity of a serving cell for which the MAC CE 1000 applies. The last three bits 1014 and the first bit 1022 of the second octet 1020 make up a control resource set (CORESET) ID field, which is four bits long and is identified with ControlResourceSetId (e.g., as specified in TS 38.331, available from 3GPP), for which the TCI State is being indicated. If the value of the field is 0, then the field refers to the CORESET configured by controlResourceSetZero (e.g., as specified in TS 38.331). A second octet 1020 includes a TCI State ID field which is seven bits long and indicates the TCI state identified by TCI-StateId (e.g., as specified in TS 38.331) applicable to a CORESET ID field. If the value of the CORESET ID field is set to 0, then the TCI State ID field indicates a TCI-StateId for a TCI state of the first 64 TCI-states configured by tci-States-ToAddModList and tci-States-ToReleaseList in the PDSCH-Config in the active BWP. If the value of the CORESET ID field is set to a value other than 0, then the TCI State ID field indicates a TCI-StateId configured by tci-StatesPDCCH-ToAddList and tci-StatesPDCCH-ToReleaseList in the controlResourceSet identified by the indicated CORESET ID.

Example Uplink Beam Failure Reporting Across Multiple CCs

Aspects of the present disclosure relate to techniques for reporting an uplink beam failure (and uplink beam reset) across multiple component carriers (CCs). The techniques presented herein may help reduce signaling overhead and/or latency, by reporting an uplink beam failure on one CC and applying the uplink beam failure across multiple CCs.

Figure 11:
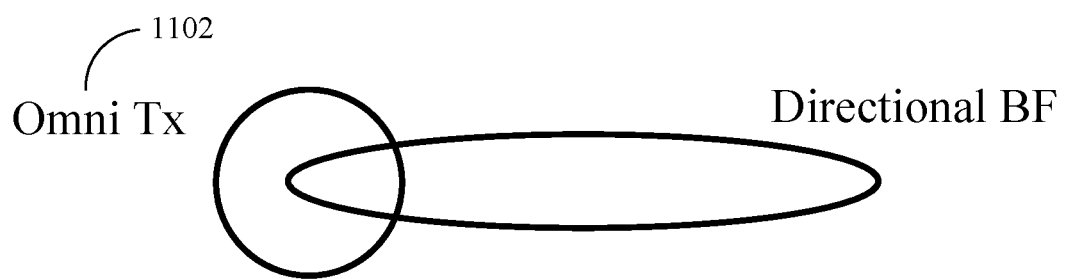
FIG. 11 illustrates an example of directional beamforming, in accordance with certain aspects of the present disclosure.

In systems utilizing millimeter wave (mmWave) transmissions, a user equipment (UE) will perform directional beamforming to boost up power. As illustrated in FIG. 11, directional beamforming concentrates transmit (Tx) power in a small angular domain in an intended transmission direction. As a result, output energy, for example in terms of equivalent isotropically radiated power (EIRP), in those angles can be potentially higher than omni-directional transmissions (Omni-Tx) 1102.

For safety reasons, a maximum permissible exposure (MPE) defines a highest energy density that can be exposed to a near field human body. MPE values are typically defined by standards bodies (e.g., institute of electrical and electronics engineers (IEEE)/federal communications commission (FCC) in the United States (U.S.)).

The MPE restriction may be most stringent in the mmWave band (e.g., 30-300 GHz) as it is believed that the electro-magnetic (EM) wave in the mmWave band may cause various human body resonances. MPE mostly considers the exposure to human body near the Tx antenna (uplink transmissions), for example, fingers or hands near the Tx antenna at a user phone (rather than other objects near the phone).

Some mmWave phones may be configured with mechanisms (e.g., radar/sensor) to detect if part of a human body is within a range of the Tx power. Once detected, a UE phone may turn down Tx power of the affected Tx antenna in order to meet MPE regulations. An uplink Tx beam which is good before MPE detection may not be usable after turning down the Tx power.

Figure 12:
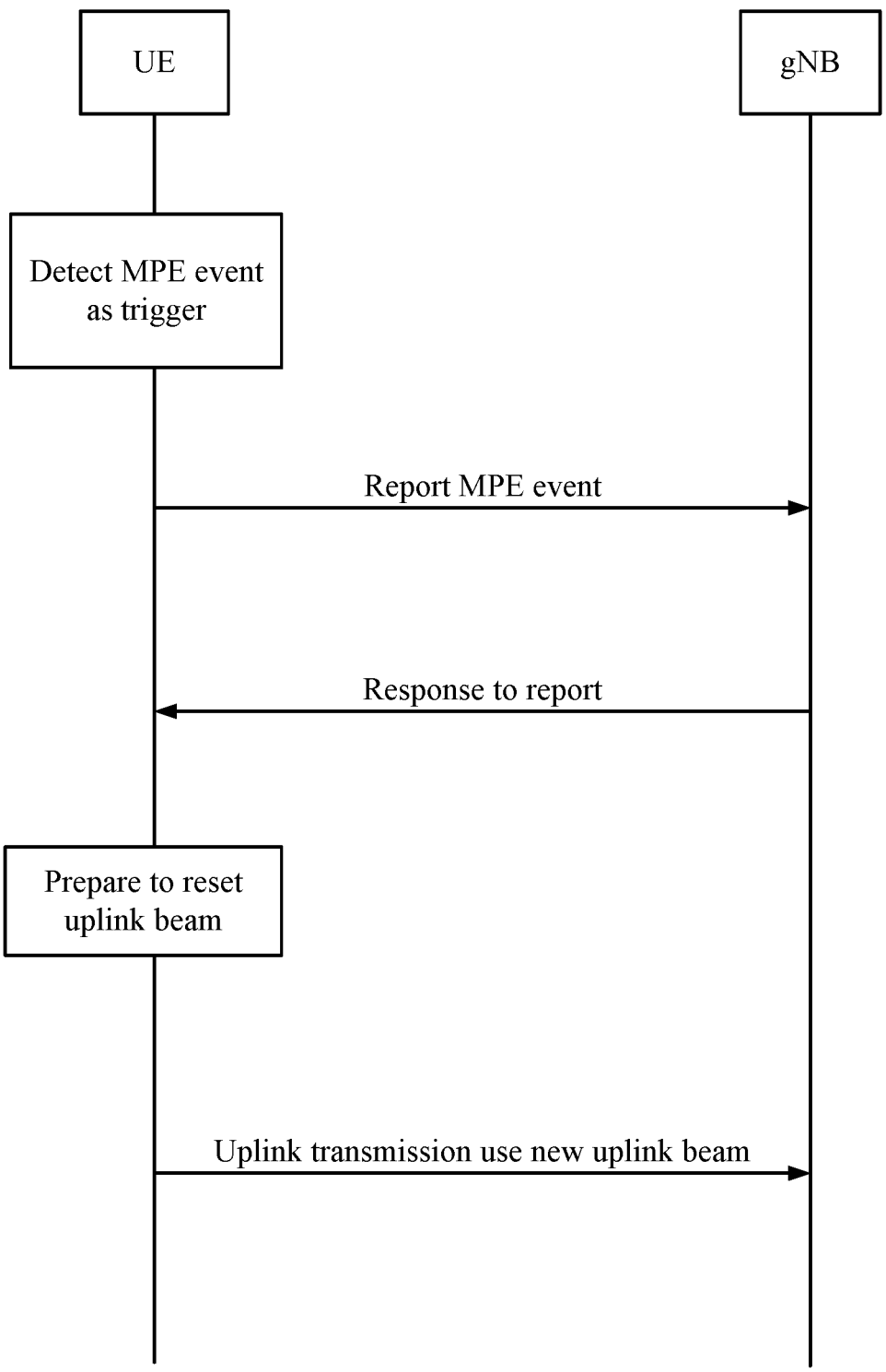
FIGS. 12 and 13 illustrate example call flow diagrams for reporting uplink beam failures, in accordance with certain aspects of the present disclosure.

Thus, as illustrated in FIG. 12, upon detecting an MPE event, a UE may report the MPE event to a base station BS (e.g., gNodeB (gNB)). In general, a CC the UE uses to send the MPE report and a CC suffered from the MPE need not be the same. For example, the UE may detect the MPE on an mmWave CC, but report the MPE event in a sub-6 GHz UL CC.

Upon receiving a response to the report from the gNB, the UE may prepare to reset an uplink beam (e.g., replacing a failed uplink beam with a new uplink beam). Subsequently, the UE may send uplink transmissions using a new uplink beam. In some cases, a rule may be defined to determine when the new uplink beam will be in use. The preparation time may be used, for example, to decode the gNB response and prepare for a new uplink beam configuration in radio frequency (RF) circuits.

Figure 13:
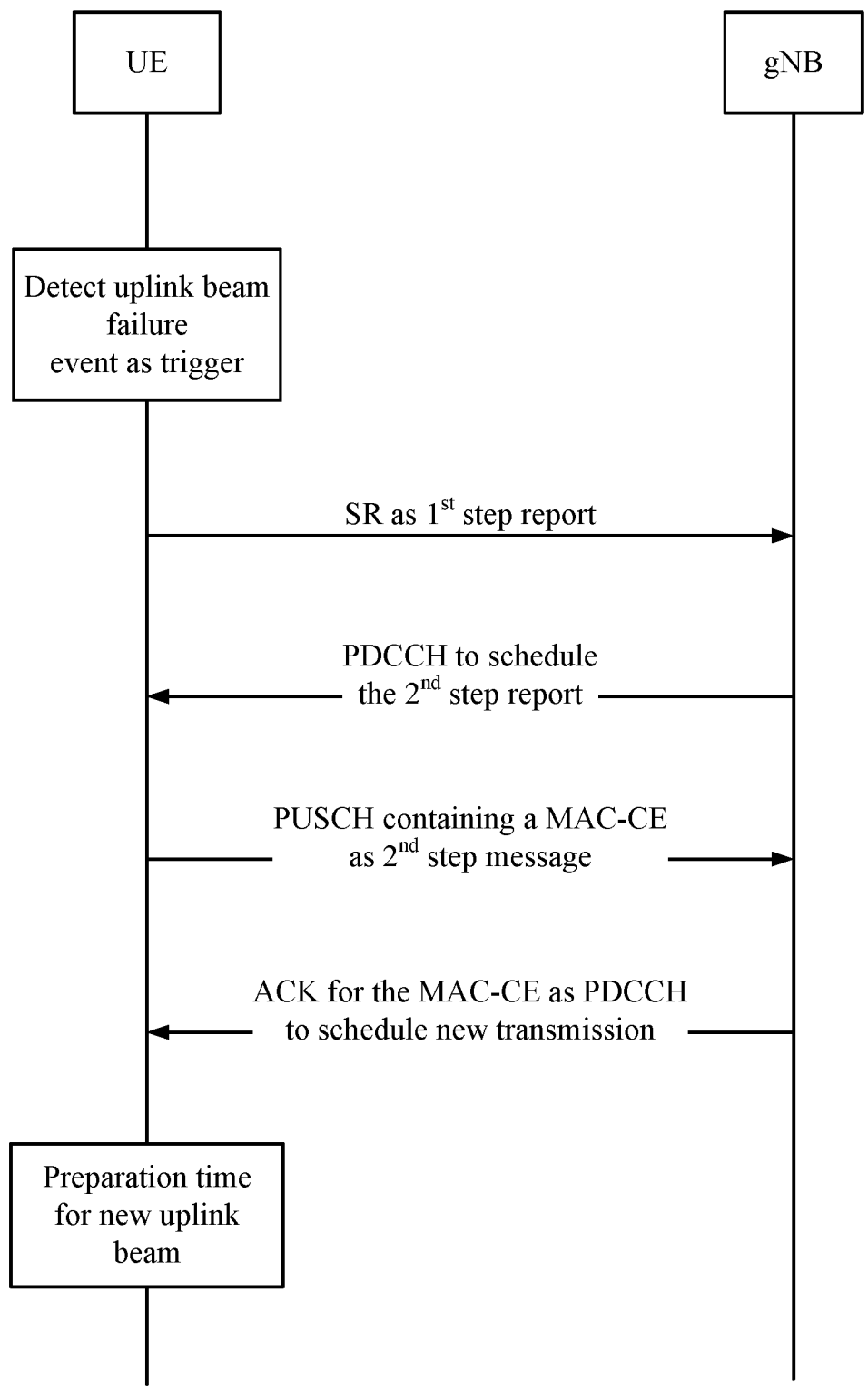

As illustrated in FIG. 13, in some cases when a UE detects an uplink beam failure (e.g., a MPE related event), the UE may send a report in a 2-step process. As illustrated, the UE may first send a scheduling request (SR), for example, on a dedicated physical uplink control channel (PUCCH) resource) and a gNB may respond with a physical downlink control channel (PDCCH) to schedule a physical uplink shared channel (PUSCH) carrying a medium access control (MAC) control element (CE) (MAC-CE) with information about the uplink beam failure. For example, the MAC-CE may be used to report a failed uplink beam, a potential new beam, and a cell ID. The gNB may send an acknowledgement (ACK) for the MAC-CE to schedule a new transmission. After some preparation time, the UE may use a new uplink beam.

In some cases, CC group based sounding reference signal (SRS) beam selection may be utilized. In such cases, when a spatial relation information element is activated, for a semi-persistent or aperiodic (SP/AP) SRS resource by the MAC-CE for a set of CCs/bandwidth parts (BWPs) at least for a same band, where the applicable list of the CCs is indicated by radio resource control (RRC) signaling, the spatial relation information may be applied for the SP/AP SRS resource(s) with the same SRS resource ID for all the BWPs in the indicated CCs.

In some cases, spatial relation information may be updated simultaneously across multiple CCs/BWPs. In such cases, up to 2 lists of CCs can be configured via the RRC signaling per the UE, and the applied list may be determined by an indicated CC in the MAC-CE. In such cases, the UE may expect no overlapped CC in multiple RRC-configured lists of CCs. The CC lists may be independent from those for simultaneous TCI state activation.

A group of CCs in a same band may share a same analog beamformer (e.g., a same UE beam) and may also share a same MPE event (and all CCs in the band of 28 GHz may experience MPE at the same time). Aspects of the present disclosure may take advantage of the observation that, to report an uplink beam failure detected on one CC and apply the beam failure across multiple CCs.

The UE may reuse a second cell (SCell) beam failure recovery (BFR) SR and MAC-CE mechanism for reporting an MPE issue. As described above, the MPE report can be sent in the MAC-CE. In addition, the failed uplink beam due to the MPE can be reset to a default beam, which can be either the new uplink beam in the MPE report or one working uplink beam (e.g., not suffering MPE).

However, in case of carrier aggregation (CA), the UE may have to report the same uplink beam failures and the potential new uplink beams for every CC, in the case where all CCs share the same analog beamformer. Reporting a failed uplink beam for every CC in this manner may affect report overhead and reliability.

Aspects of the present disclosure relate to techniques for reporting an uplink beam failure (and uplink beam reset) across multiple CCs. The techniques presented herein may help reduce signaling overhead and/or latency, by reporting an uplink beam failure on one CC and applying the beam failure across multiple CCs.

Figure 14:
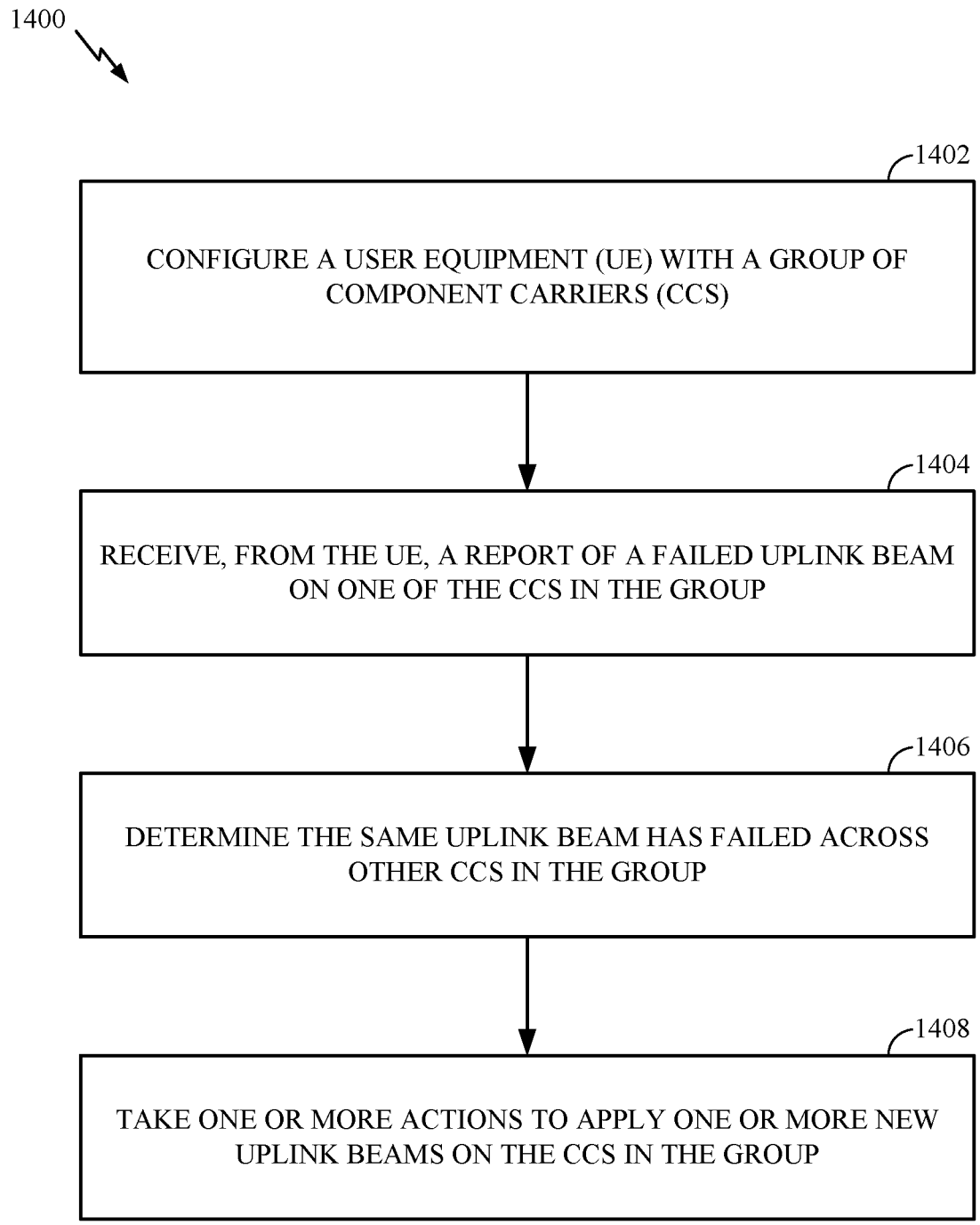
FIG. 14 illustrates example operations for wireless communications by a network entity, in accordance with certain aspects of the present disclosure.

FIG. 14 illustrates example operations 1400 for wireless communications by a network entity, in accordance with aspects of the present disclosure. For example, operations 1400 may be performed by a network entity (e.g., such as the BS 110 of FIG. 1 or FIG. 4) to receive a report of an uplink bean failure on one CC and apply it across a group of CCs.

Operations 1400 begin, at 1402, by configuring a UE with a group of CCs. At 1404, the network entity receives, from the UE, a report of a failed uplink beam on one of the CCs in the group. At 1406, the network entity determines the same uplink beam has failed across other CCs in the group. At 1408, the network entity takes one or more actions to apply one or more new uplink beams on the CCs in the group.

Figure 15:
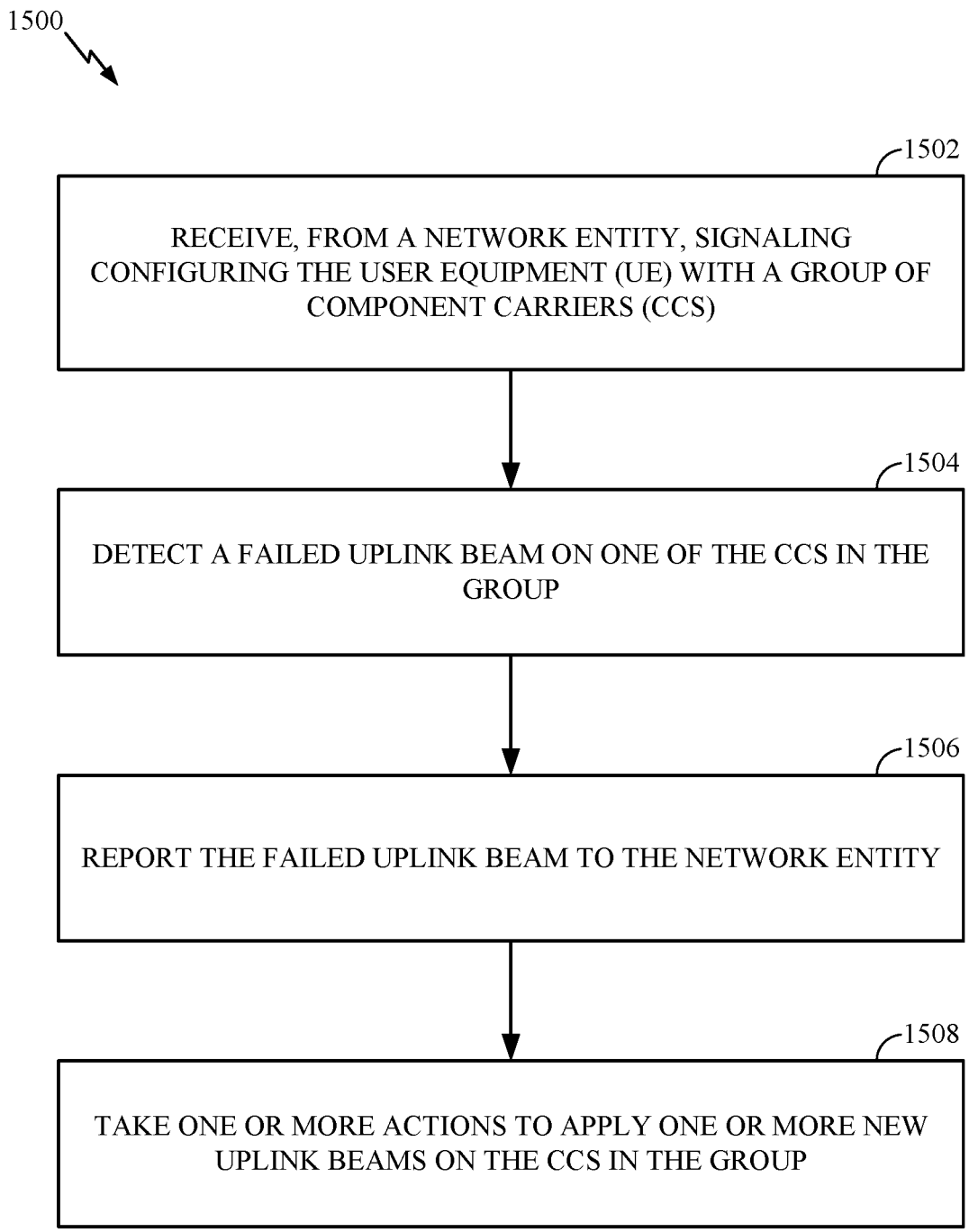
FIG. 15 illustrates example operations for wireless communications by a UE, in accordance with certain aspects of the present disclosure.

FIG. 15 illustrates example operations 1500 for wireless communications by a UE, in accordance with aspects of the present disclosure. Operations 1500 may be performed, for example, by a UE (e.g., such as the UE 120 in FIG. 1 or FIG. 4), to report a common uplink beam failure across multiple CCs.

Operations 1500 begin, at 1502, by receiving, from a network entity, signaling configuring the UE with a group of CCs. At 1504, the UE detects a failed uplink beam on one of the CCs in the group. At 1506, the UE reports the failed uplink beam to the network entity. At 1508, the UE takes one or more actions to apply one or more new uplink beams on the CCs in the group.

As noted above, operations 1400 and 1500 may help reduce overhead and/or latency by effectively utilizing a single report of an uplink beam failure, detected on one CC, to apply the beam failure (and reset an uplink beam) across multiple CCs and/or BWPs therein.

Figure 16:
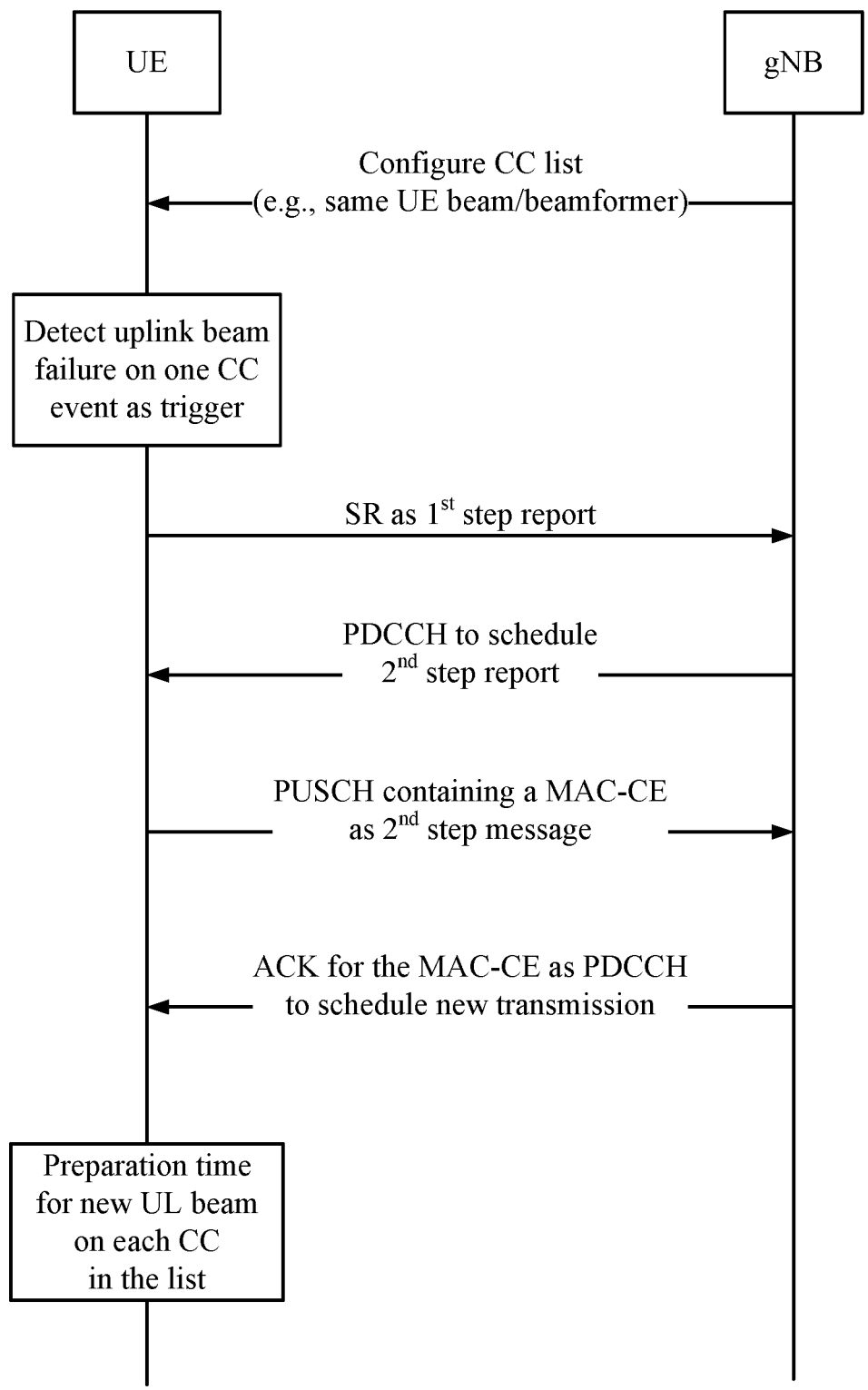
FIG. 16 illustrates an example call flow diagram for reporting an uplink beam failure across multiple component carriers (CCs), in accordance with certain aspects of the present disclosure.

Operations 1400 and 1500 may be understood with reference to the call flow diagram of FIG. 16.

As illustrated, a network entity (e.g., gNB) may first configure a UE with a list of CCs. The list of CCs may be determined, for example, based on UE capability (e.g., the UE has a same analog beamformer on those CCs).

The UE may detect an uplink beam failure on one CC (e.g., due to a MPE). The UE may then generate a beam failure report that may include an indication of a new uplink beam to replace a failed uplink beam.

As illustrated, if the CC list is configured and the UE detects the uplink beam failure on one CC (e.g., due to a MPE,) it means the same uplink beam likely fails on all CCs in the same CC list. Therefore, upon reporting the uplink beam failure on the one CC (e.g., via a MAC CE as shown), the uplink failure may be applied across all CCs. In some cases, the CC list and the UE capability may reuse mechanisms similar to those for simultaneous spatial relation updates across multiple CCs (e.g., in Rel-16).

As used herein, the same uplink beam across CCs may refer to uplink beams that use a same downlink/uplink RS, spatial relation information, or uplink TCI state for the uplink beam indication. In addition, the range of resources suffering uplink beam failure can be determined with various options.

For example, according to a first option, any (uplink/downlink) resource using the reported (failed) uplink beam across the CCs in the CC list may be regarded as suffering the uplink beam failure. In other words, some uplink beams may be used to indicate a downlink beam (e.g., CSI-RS may be used to determine a beam for SRS that uses a failed beam).

For an MPE event, however only uplink resources may be effected (and downlink resources need not be modified). Therefore, according to a second option, only uplink (e.g., PUCCH/SRS/PUSCH) resources across the CCs with a same resource ID as the reported resource with the failed uplink beam may be regarded as suffering the uplink beam failure.

In some cases, whether the gNB is to determine effected resources based on the first option (downlink/uplink both) or the second option (uplink update only) may be based on UE signaling. For example, the beam failure report may indicate whether the uplink beam failure is the MPE (if so, the second option may be used so the gNB only applies updates to the uplink resources).

As also shown in FIG. 16, if a CC list is configured and the UE reports an uplink beam failure on one CC (e.g., due to the MPE), the same new uplink beam replacing the failed uplink beam on the reported CC determined based on the beam failure report may be applied to all the CCs in the CC list. Which beams are considered the same uplink beam across the CCs, the CC list, and the UE capability may be determined as indicated above.

In some cases, the timing for the new uplink beam to replace the failed uplink beam on all the CCs may be the same as the timing for the new uplink beam on the reported CC.

In addition, the range of resources to which the new uplink beam applies can be determined according to the first and second options described above (and which option is used may be based on the UE signaling). According to the first option, any resource using the failed uplink beam across the CCs in the CC list will use the new uplink beam. According to the second option, only PUCCH/SRS/PUSCH resources across the CCs with the same resource ID as the reported resource with the failed uplink beam will use the new uplink beam.

As described herein, reporting an uplink beam failure (and uplink beam reset) across multiple CCs may help reduce signaling overhead and/or latency, by reporting an uplink beam failure on one CC and applying the beam failure across multiple CCs.

Figure 17:
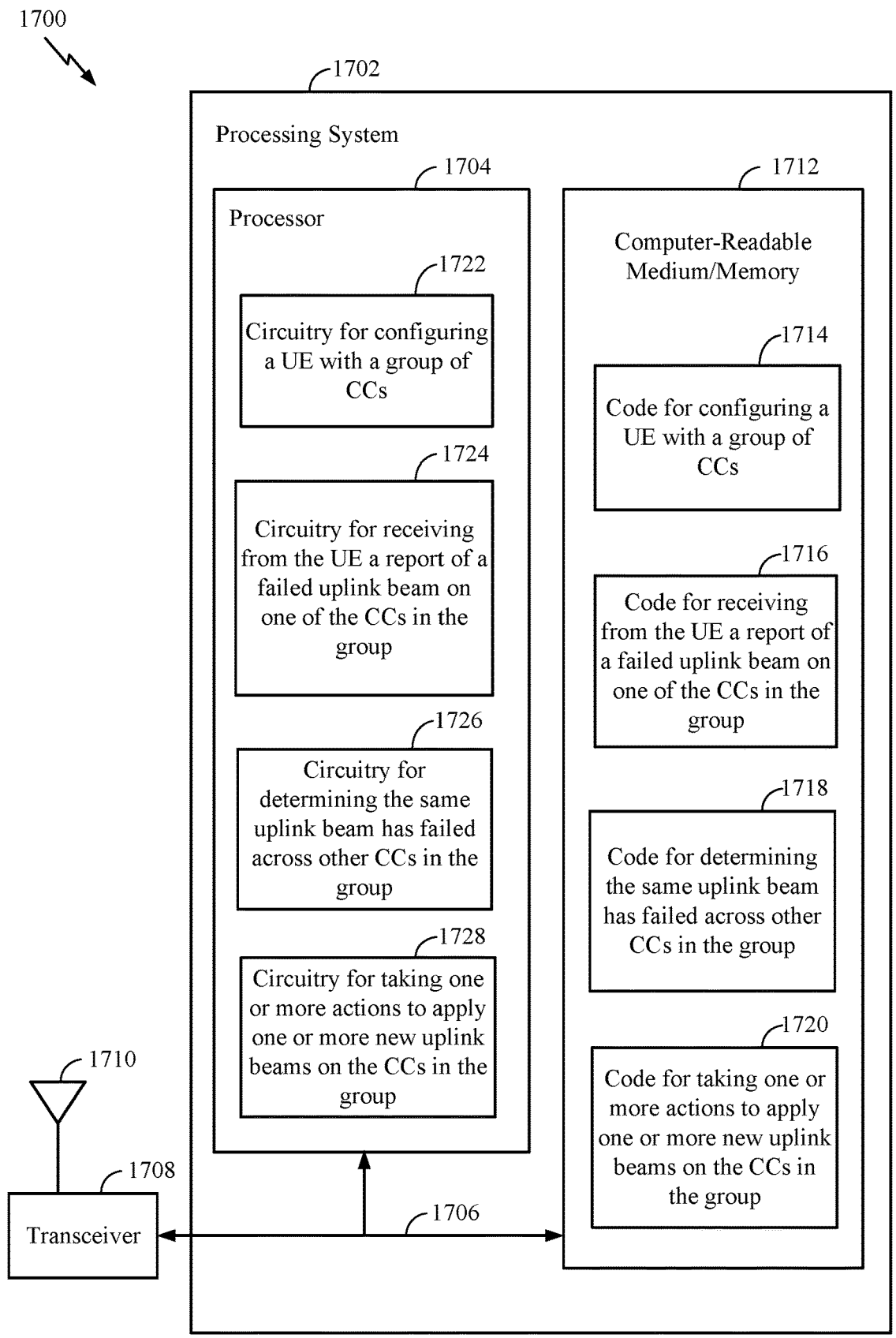
FIG. 17 illustrates a communications device that may include various components configured to perform operations for techniques disclosed herein, according to aspects of the present disclosure.

FIG. 17 illustrates a communications device 1700 that may include various components (e.g., corresponding to means-plus-function components) configured to perform operations for the techniques disclosed herein, such as the operations illustrated in FIG. 14. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 is configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., a computer-executable code) that when executed by the processor 1704, cause the processor 1704 to perform the operations illustrated in FIG. 14, or other operations for performing the various techniques discussed herein. In certain aspects, computer-readable medium/memory 1712 stores code 1714 for configuring, code 1716 for receiving, code 1718 for determining, and code 1720 for taking. The code 1714 for configuring may include code for configuring a UE with a group of CCs. The code 1716 for receiving may include code for receiving from the UE a report a failed uplink beam on one of the CCs in the group. The code 1718 for determining may include code for determining the same uplink beam has failed across other CCs in the group. The code 1720 for taking may include code for taking one or more actions to apply one or more new uplink beams on the CCs in the group.

The processor 1704 may include circuitry configured to implement the code stored in the computer-readable medium/memory 1712, such as for performing the operations illustrated in FIG. 14, as well as other operations for performing the various techniques discussed herein. For example, the processor 1704 includes circuitry 1722 for configuring, circuitry 1724 for receiving, circuitry 1726 for determining, and circuitry 1728 for taking. The circuitry 1722 for configuring may include circuitry for configuring a UE with a group of CCs. The circuitry 1724 for receiving may include circuitry for receiving from the UE a report a failed uplink beam on one of the CCs in the group. The circuitry 1726 for determining may include circuitry for determining the same uplink beam has failed across other CCs in the group. The circuitry 1728 for taking may include circuitry for taking one or more actions to apply one or more new uplink beams on the CCs in the group.

Figure 18:
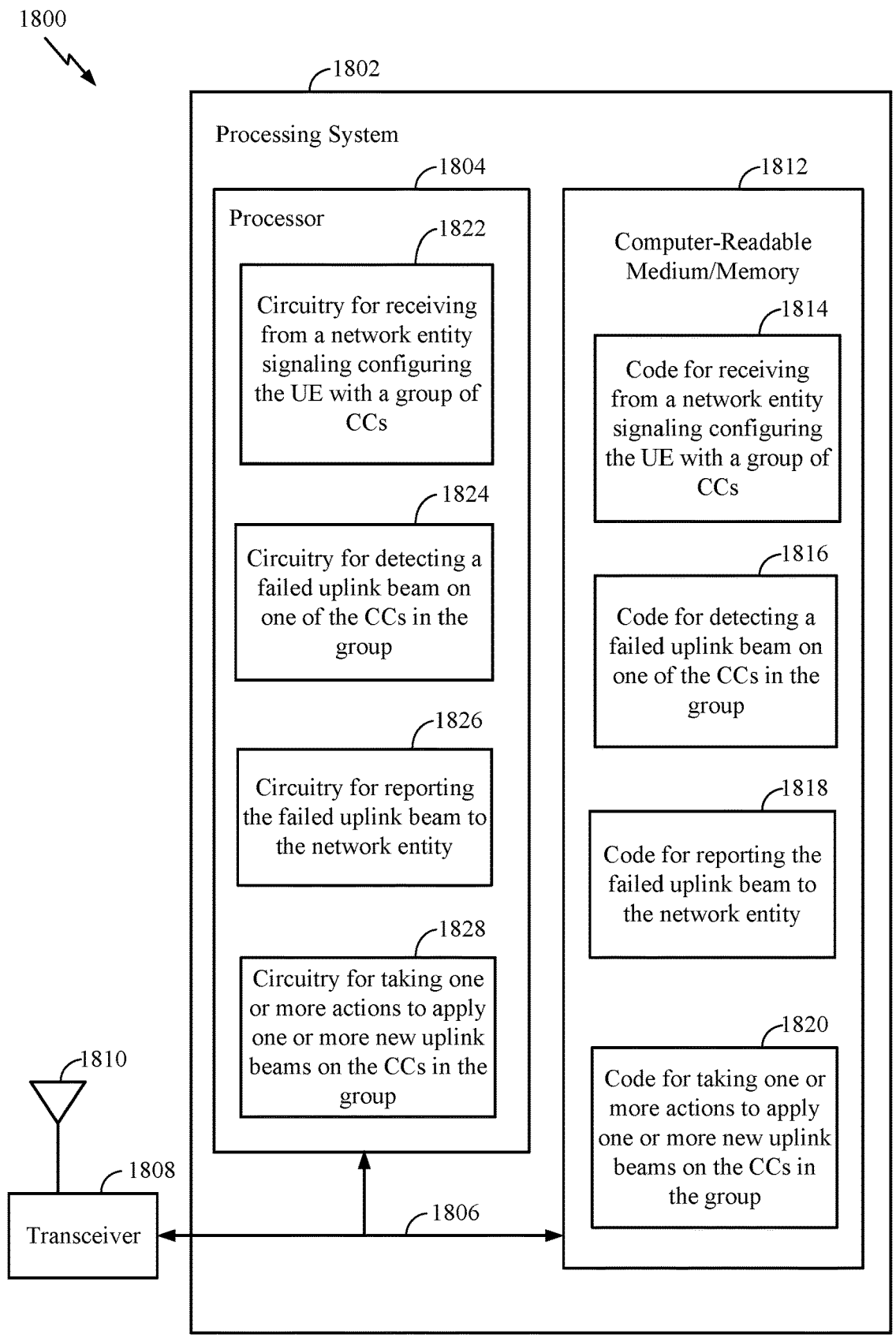
FIG. 18 illustrates a communications device that may include various components configured to perform operations for techniques disclosed herein, according to aspects of the present disclosure.

FIG. 18 illustrates a communications device 1800 that may include various components (e.g., corresponding to means-plus-function components) configured to perform operations for the techniques disclosed herein, such as the operations illustrated in FIG. 15. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 is configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., a computer-executable code) that when executed by the processor 1804, cause the processor 1804 to perform the operations illustrated in FIG. 15, or other operations for performing the various techniques discussed herein. In certain aspects, computer-readable medium/memory 1812 stores code 1814 for receiving, code 1816 for detecting, code 1818 for reporting, and code 1820 for taking. The code 1814 for receiving may include code for receiving from a network entity signaling configuring the UE with a group of CCs. The code 1816 for detecting may include code for detecting a failed uplink beam on one of the CCs in the group. The code 1818 for reporting may include code for reporting the failed uplink beam to the network entity. The code 1820 for taking may include code for taking one or more actions to apply one or more new uplink beams on the CCs in the group.

The processor 1804 may include circuitry configured to implement the code stored in the computer-readable medium/memory 1812, such as for performing the operations illustrated in FIG. 15, as well as other operations for performing the various techniques discussed herein. For example, the processor 1804 includes circuitry 1822 for receiving, circuitry 1824 for detecting, circuitry 1826 for reporting, and circuitry 1828 for taking. The circuitry 1822 for receiving may include circuitry for receiving from a network entity signaling configuring the UE with a group of CCs. The circuitry 1824 for detecting may include circuitry for detecting a failed uplink beam on one of the CCs in the group. The circuitry 1826 for reporting may include circuitry for reporting the failed uplink beam to the network entity. The circuitry 1828 for taking may include circuitry for taking one or more actions to apply one or more new uplink beams on the CCs in the group.

Example Aspects

In a first aspect, a method for wireless communications by a network entity includes configuring a UE with a group of CCs; receiving, from the UE, a report of a failed uplink beam on one of the CCs in the group; determining the same uplink beam has failed across other CCs in the group; and taking one or more actions to apply one or more new uplink beams on the CCs in the group.

In a second aspect, alone or in combination with the first aspect, determining the CCs in the group based on a capability of the UE, wherein the capability indicates the UE uses a same analog beamformer on CCs in the group.

In a third aspect, alone or in combination with one or more of the first and second aspects, the same failed uplink beam across CCs uses same downlink and uplink reference signals, same spatial relation information, or same uplink TCI state for beam indication.

In a fourth aspect, alone or in combination with one or more of the first through third aspects, determining resources impacted by the uplink beam failure based on signaling from the UE, wherein the determined resources comprise at least of: any resources that use the failed uplink beam across CCs in the CC list or only uplink transmission resources across CCs with a same resource ID as a reported resource with the failed uplink beam.

In a fifth aspect, alone or in combination with one or more of the first through fourth aspects, if the UE signaling indicates the uplink beam failure relates to (MPE, the determined resources comprise only uplink transmission resources across CCs with a same resource ID as a reported resource with the failed uplink beam.

In a sixth aspect, alone or in combination with one or more of the first through fifth aspects, the one or more actions comprise replacing the failed uplink beam with a same new uplink beam identified based on the report across CCs in the group, and wherein the same new uplink beam across CCs in the group uses same downlink and uplink reference signals, same spatial relation information, or same uplink TCI state for beam indication.

In a seventh aspect, alone or in combination with one or more of the first through sixth aspects, the report comprises an indication of a new uplink beam to replace the failed uplink beam.

In an eighth aspect, alone or in combination with one or more of the first through seventh aspects, the new uplink beam replaces the failed uplink beam across CCs with a same timing.

In a ninth aspect, alone or in combination with one or more of the first through eighth aspects, determining which resources the new uplink beam applies to.

In a tenth aspect, alone or in combination with one or more of the first through ninth aspects, the determination is that the new uplink beam applies to any resources that use the failed uplink beam across CCs in the CC list.

In an eleventh aspect, alone or in combination with one or more of the first through tenth aspects, the determination is that the new uplink beam applies to only uplink transmission resources across CCs with a same resource ID as a reported resource with the failed uplink beam.

In a twelfth aspect, alone or in combination with one or more of the first through eleventh aspects, the network entity determines which resources the new uplink beam applies to based on signaling from the UE.

In a thirteenth aspect, alone or in combination with one or more of the first through twelfth aspects, if the UE signaling indicates the uplink beam failure relates to MPE, the determination is the new uplink beam applies only to uplink transmission resources across CCs with a same resource ID as a reported resource with the failed uplink beam.

In a fourteenth aspect, a method for wireless communications by a UE includes receiving, from a network entity, signaling configuring the UE with a group of CCs; detecting a failed uplink beam on one of the CCs in the group; reporting the failed uplink beam to the network entity; and taking one or more actions to apply one or more new uplink beams on the CCs in the group.

In a fifteenth aspect, alone or in combination with the fourteenth aspect, the CCs in the group are determined based on a capability of the UE, and wherein the capability indicates the UE uses a same analog beamformer on CCs in the group.

In a sixteenth aspect, alone or in combination with one or more of the fourteenth and fifteenth aspects, the same failed uplink beam across CCs uses same downlink and uplink reference signals, same spatial relation information, or same uplink TCI state for beam indication.

In a seventeenth aspect, alone or in combination with one or more of the fourteenth through sixteenth aspects, determining resources impacted by the uplink beam failure where the determined resources comprise at least one of: any resources that use the failed uplink beam across CCs in the CC list or only uplink transmission resources across CCs with a same resource ID as a reported resource with the failed uplink beam.

In an eighteenth aspect, alone or in combination with one or more of the fourteenth through seventeenth aspects providing signaling to the network entity that determines the resources impacted by the uplink beam failure.

In a nineteenth aspect, alone or in combination with one or more of the fourteenth through eighteenth aspects, if the UE signaling indicates the uplink beam failure relates to a MPE, the determined resources comprise only uplink transmission resources across CCs with a same resource ID as a reported resource with the failed uplink beam.

In a twentieth aspect, alone or in combination with one or more of the fourteenth through nineteenth aspects, the one or more actions comprise replacing the failed uplink beam with a same new uplink beam identified based on the reporting across CCs in the group, wherein the same new uplink beam across CCs in the group uses same downlink and uplink reference signals, same spatial relation information, or same uplink TCI state for beam indication, and wherein the new uplink beam replaces the failed uplink beam across CCs with a same timing.

In a twenty-one aspect, alone or in combination with one or more of the fourteenth through twentieth aspects, the reporting further comprises an indication of a new uplink beam to replace the failed uplink beam.

In a twenty-second aspect, alone or in combination with one or more of the fourteenth through twenty-first aspects, determining which resources the new uplink beam applies to.

In a twenty-third aspect, alone or in combination with one or more of the fourteenth through twenty-second aspects, the determination is that the new uplink beam applies to any resources that use the failed uplink beam across CCs in the CC list.

In a twenty-fourth aspect, alone or in combination with one or more of the fourteenth through twenty-second aspects, the determination is that the new uplink beam applies to only uplink transmission resources across CCs with a same resource ID as a reported resource with the failed uplink beam.

In a twenty-fifth aspect, alone or in combination with one or more of the fourteenth through twenty-second aspects, providing signaling to the network entity that determines which resources the new uplink beam applies to.

In a twenty-sixth aspect, alone or in combination with one or more of the fourteenth through twenty-fifth aspects, if the UE signaling indicates the uplink beam failure relates to MPE, the determination is the new uplink beam applies only to uplink transmission resources across CCs with a same resource ID as a reported resource with the failed uplink beam.

In a twenty-seventh aspect, an apparatus for wireless communications by a network entity includes a transmitter configured to signal, to a UE, a configuration of a group of CCs; a receiver configured to receive, from the UE, a report a failed uplink beam on one of the CCs in the group; and at least one processor configured to determine the same uplink beam has failed across other CCs in the group and take one or more actions to apply one or more new uplink beams on the CCs in the group.

In a twenty-eighth aspect, alone or in combination with the twenty-seventh aspect, the at least one processor is further configured to determine the CCs in the group based on a capability of the UE, wherein the capability indicates the UE uses a same analog beamformer on CCs in the group.

In a twenty-ninth aspect, an apparatus for wireless communications by a UE includes a receiver configured to receive, from a network entity, signaling configuring the UE with a group of CCs; and at least one processor configured to detect a failed uplink beam on one of the CCs in the group, report the failed uplink beam to the network entity, and take one or more actions to apply one or more new uplink beams on the CCs in the group.

In a thirtieth aspect, alone or in combination with the twenty-ninth aspect, the at least one processor is further configured to determine resources impacted by the uplink beam failure, wherein the determined resources comprise at least one of: any resources that use the failed uplink beam across CCs in the CC list or only uplink transmission resources across CCs with a same resource ID as a reported resource with the failed uplink beam.

Additional Considerations

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, operations 1400 and 1500 of FIGS. 14 and 15 may be performed by various processors shown in FIG. 4. Generally, where there are operations illustrated in figures, those operations may have corresponding counterpart means-plus-function.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). The phrase computer readable medium does not refer to a transitory propagating signal. In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a network entity, comprising:
configuring a user equipment (UE) with a group of component carriers (CCs);
receiving, from the UE, a report of a failed uplink beam on one of the CCs in the group;
determining the same uplink beam has failed across other CCs in the group; and
taking one or more actions to apply one or more new uplink beams on the CCs in the group.

2. The method of claim 1, further comprising:
determining the CCs in the group based on a capability of the UE, wherein the capability indicates the UE uses a same analog beamformer on the CCs in the group.

3. The method of claim 1, wherein the same failed uplink beam across the CCs in the group uses same downlink and uplink reference signals, same spatial relation information, or same uplink transmission configuration information (TCI) state for beam indication.

4. The method of claim 1, further comprising:
determining resources impacted by the failed uplink beam based on signaling from the UE, wherein the determined resources comprise at least of: any resources that use the failed uplink beam across multiple CCs in a CC list or only uplink transmission resources across multiple CCs with a same resource ID as a reported resource with the failed uplink beam.

5. The method of claim 4, wherein, if the UE signaling indicates the failed uplink beam relates to a maximum permissible exposure (MPE):
the determined resources comprise only uplink transmission resources across the multiple CCs with the same resource ID as a reported resource with the failed uplink beam.

6. The method of claim 1, wherein the one or more actions comprise replacing the failed uplink beam with a same new uplink beam identified based on the report across the CCs in the group, and wherein the same new uplink beam across the CCs in the group uses same downlink and uplink reference signals, same spatial relation information, or same uplink transmission configuration information (TCI) state for beam indication.

7. The method of claim 6, wherein the report comprises an indication of a new uplink beam to replace the failed uplink beam.

8. The method of claim 7, wherein the new uplink beam replaces the failed uplink beam across the CCs in the group with a same timing.

9. The method of claim 7, further comprising determining which resources the new uplink beam applies to.

10. The method of claim 9, wherein the determination is that the new uplink beam applies to any resources that use the failed uplink beam across multiple CCs in a CC list.

11. The method of claim 9, wherein the determination is that the new uplink beam applies to only uplink transmission resources across multiple CCs with a same resource ID as a reported resource with the failed uplink beam.

12. The method of claim 9, wherein the network entity determines which resources the new uplink beam applies to based on signaling from the UE.

13. The method of claim 12, wherein, if the UE signaling indicates the failed uplink beam relates to a maximum permissible exposure (MPE):
the determination is the new uplink beam applies only to uplink transmission resources across multiple CCs with a same resource ID as a reported resource with the failed uplink beam.

14. A method for wireless communications by a user equipment (UE), comprising:
receiving, from a network entity, signaling configuring the UE with a group of component carriers (CCs);

detecting a failed uplink beam on one of the CCs in the group, wherein the detecting indicates the same uplink beam has failed across other CCs in the group;

reporting the failed uplink beam to the network entity; and taking one or more actions to apply one or more new uplink beams on the CCs in the group.

15. The method of claim 14, wherein the CCs in the group are determined based on a capability of the UE, and wherein the capability indicates the UE uses a same analog beamformer on the CCs in the group.

16. The method of claim 14, wherein the same failed uplink beam across the CCs in the group uses same downlink and uplink reference signals, same spatial relation information, or same uplink transmission configuration information (TCI) state for beam indication.

17. The method of claim 14, further comprising:
determining resources impacted by the failed uplink beam, wherein the determined resources comprise: any resources that use the failed uplink beam across multiple CCs in a CC list or only uplink transmission resources across multiple CCs with a same resource ID as a reported resource with the failed uplink beam.

18. The method of claim 17, further comprising:
providing signaling to the network entity that determines the resources impacted by the failed uplink beam.

19. The method of claim 18, wherein, if the UE signaling indicates the failed uplink beam relates to a maximum permissible exposure (MPE):
the determined resources comprise only uplink transmission resources across the multiple CCs with the same resource ID as a reported resource with the failed uplink beam.

20. The method of claim 14, wherein the one or more actions comprise replacing the failed uplink beam with a same new uplink beam identified based on the reporting across the CCs in the group, wherein the same new uplink beam across the CCs in the group uses same downlink and uplink reference signals, same spatial relation information, or same uplink transmission configuration information (TCI) state for beam indication, and wherein the new uplink beam replaces the failed uplink beam across the CCs in the group with a same timing.

21. The method of claim 20, wherein the reporting further comprises an indication of a new uplink beam to replace the failed uplink beam.

22. The method of claim 21, further comprising:
determining which resources the new uplink beam applies to.

23. The method of claim 22, wherein the determination is that the new uplink beam applies to any resources that use the failed uplink beam across multiple CCs in a CC list.

24. The method of claim 22, wherein the determination is that the new uplink beam applies to only uplink transmission resources across multiple CCs with a same resource ID as a reported resource with the failed uplink beam.

25. The method of claim 22, further comprising:
providing signaling to the network entity that determines which resources the new uplink beam applies to.

26. The method of claim 25, wherein, if the UE signaling indicates the failed uplink beam relates to maximum permissible exposure (MPE):
the determination is the new uplink beam applies only to uplink transmission resources across multiple CCs with a same resource ID as a reported resource with the failed uplink beam.

27. An apparatus for wireless communications by a network entity, comprising:
a transmitter configured to signal, to a user equipment (UE), a configuration of a group of component carriers (CCs);
a receiver configured to receive, from the UE, a report a failed uplink beam on one of the CCs in the group; and
at least one processor configured to determine the same uplink beam has failed across other CCs in the group and take one or more actions to apply one or more new uplink beams on the CCs in the group.

28. The apparatus of claim 27, wherein the at least one processor is further configured to determine the CCs in the group based on a capability of the UE, wherein the capability indicates the UE uses a same analog beamformer on the CCs in the group.

29. An apparatus for wireless communications by a user equipment (UE), comprising:
a receiver configured to receive, from a network entity, signaling configuring the UE with a group of component carriers (CCs); and
at least one processor configured to:
detect a failed uplink beam on one of the CCs in the group, wherein the detection indicates the same uplink beam has failed across other CCs in the group, report the failed uplink beam to the network entity, and take one or more actions to apply one or more new uplink beams on the CCs in the group.

30. The apparatus of claim 29, wherein the at least one processor is further configured to determine resources impacted by the failed uplink beam, wherein the determined resources comprise at least one of: any resources that use the failed uplink beam across multiple CCs in a CC list or only uplink transmission resources across multiple CCs with a same resource ID as a reported resource with the failed uplink beam.

* * * * *